(12) United States Patent
Narroschke et al.

(10) Patent No.: US 9,948,958 B2
(45) Date of Patent: *Apr. 17, 2018

(54) LOW COMPLEX DEBLOCKING FILTER DECISIONS

(71) Applicant: Sun Patent Trust, New York, NY (US)

(72) Inventors: Matthias Narroschke, Schaafheim (DE); Semih Esenlik, Nazilli (TR); Thomas Wedi, The Hague (NL)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/475,818

(22) Filed: Mar. 31, 2017

(65) Prior Publication Data

US 2017/0208346 A1   Jul. 20, 2017

Related U.S. Application Data

(60) Continuation of application No. 15/184,037, filed on Jun. 16, 2016, now Pat. No. 9,648,354, which is a
(Continued)

(51) Int. Cl.
*H04N 19/176* (2014.01)
*H04N 19/117* (2014.01)
(Continued)

(52) U.S. Cl.
CPC ......... *H04N 19/865* (2014.11); *H04N 19/117* (2014.11); *H04N 19/124* (2014.11);
(Continued)

(58) Field of Classification Search
CPC ...... H04N 19/117; H04N 19/86; H04N 19/14; H04N 19/176; H04N 19/82;
(Continued)

(56) References Cited

U.S. PATENT DOCUMENTS 5,796,875 A   8/1998   Read
6,504,873 B1   1/2003   Vehvilainen
(Continued)

FOREIGN PATENT DOCUMENTS

JP   2007-504773   3/2007
JP   2011-160359   8/2011
(Continued)

OTHER PUBLICATIONS

International Search Report and Written Opinion of the International Searching Authority dated Nov. 23, 2012 in corresponding International Application No. PCT/EP2012/067433.
(Continued)

*Primary Examiner* — Nathanael Aynalem
(74) *Attorney, Agent, or Firm* — Wenderoth, Lind & Ponack, L.L.P.

(57) ABSTRACT

The present disclosure relates to deblocking filtering, which may be advantageously applied for block-wise encoding and decoding of images or video signals. In particular, the present disclosure relates to an improved memory management in an automated decision on whether to apply or skip deblocking filtering for a block and to selection of the deblocking filter. The decision is performed on the basis of a segmentation of blocks in such a manner that memory usage is optimized. Preferably, the selection of appropriate deblocking filters is improved so as to reduce computational expense.

4 Claims, 43 Drawing Sheets

Related U.S. Application Data continuation of application No. 14/755,414, filed on Jun. 30, 2015, now Pat. No. 9,402,088, which is a division of application No. 14/200,911, filed on Mar. 7, 2014, now Pat. No. 9,143,778, which is a continuation of application No. PCT/EP2012/067433, filed on Sep. 6, 2012.

(60) Provisional application No. 61/532,793, filed on Sep. 9, 2011.

(51) Int. Cl.
| | |
|---|---|
| *H04N 19/136* | (2014.01) |
| *H04N 19/82* | (2014.01) |
| *H04N 19/86* | (2014.01) |
| *H04N 19/124* | (2014.01) |
| *H04N 19/13* | (2014.01) |
| *H04N 19/182* | (2014.01) |
| *H04N 19/172* | (2014.01) |

(52) U.S. Cl.
CPC ........... *H04N 19/13* (2014.11); *H04N 19/136* (2014.11); *H04N 19/176* (2014.11); *H04N 19/182* (2014.11); *H04N 19/82* (2014.11); *H04N 19/86* (2014.11); *H04N 19/172* (2014.11)

(58) Field of Classification Search
CPC ............. H04N 19/00896; H04N 19/61; H04N 19/0089; H04N 19/17; H04N 19/00066; H04N 19/00909; H04N 19/157; H04N 19/186; H04N 19/436; H04N 19/50; H04N 19/523
USPC ........................................ 375/240.01–240.29
See application file for complete search history.

(56) References Cited

U.S. PATENT DOCUMENTS

| | | | | |
|---|---|---|---|---|
| 6,529,638 | B1* | 3/2003 | Westerman | H04N 19/86 375/E7.19 |
| 7,162,093 | B2 | 1/2007 | Regunathan et al. | |
| 2001/0017944 | A1* | 8/2001 | Kalevo | H04N 19/86 382/268 |
| 2003/0138160 | A1 | 7/2003 | Ishikawa | |
| 2004/0032908 | A1 | 2/2004 | Hagai | |
| 2004/0126034 | A1* | 7/2004 | Yu | H04N 19/176 382/260 |
| 2005/0053158 | A1* | 3/2005 | Regunathan | H04N 19/105 375/240.25 |
| 2005/0100237 | A1* | 5/2005 | Kong | H04N 19/176 382/261 |
| 2005/0201633 | A1* | 9/2005 | Moon | H04N 19/176 382/268 |
| 2005/0259744 | A1* | 11/2005 | Hellman | H04N 19/176 375/240.24 |
| 2005/0259887 | A1 | 11/2005 | Hellman | |
| 2005/0281339 | A1* | 12/2005 | Song | H04N 19/176 375/240.24 |
| 2006/0078048 | A1 | 4/2006 | Bjontegaard | |
| 2006/0110065 | A1* | 5/2006 | Huang | G06T 5/002 382/275 |
| 2006/0174236 | A1 | 8/2006 | Stein | |
| 2007/0071095 | A1* | 3/2007 | Lim | H04N 19/86 375/240.08 |
| 2007/0092002 | A1 | 4/2007 | Xue | |
| 2007/0201564 | A1* | 8/2007 | Joch | H04N 19/159 375/240.29 |
| 2008/0025632 | A1 | 1/2008 | Bjontegaard | |
| 2008/0117980 | A1* | 5/2008 | Hung | H04N 19/176 375/240.24 |
| 2008/0159404 | A1* | 7/2008 | Hong | H04N 19/50 375/240.23 |
| 2008/0243981 | A1 | 10/2008 | Wilson | |
| 2009/0080517 | A1 | 3/2009 | Ko | |
| 2010/0142844 | A1* | 6/2010 | Pereira | G06T 5/002 382/261 |
| 2011/0002395 | A1 | 1/2011 | Nishihara | |
| 2011/0110603 | A1* | 5/2011 | Ikai | H04N 19/176 382/260 |
| 2011/0170795 | A1* | 7/2011 | Higuchi | H04N 19/176 382/260 |
| 2013/0251029 | A1 | 9/2013 | Ikeda | |
| 2013/0251050 | A1 | 9/2013 | Ikeda et al. | |

FOREIGN PATENT DOCUMENTS

| | | |
|---|---|---|
| WO | 2005/027495 | 3/2005 |
| WO | 2009/123033 | 10/2009 |

OTHER PUBLICATIONS

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, 5th Meeting: Geneva, CH, Mar. 16-23, 2011, freely available under http://wftp3.itu.int/av-arch/jctvc-site/.

Frank Bossen, "Common test conditions and software reference configurations", Joint Collaborative Team on Video Coding (JCT-VC) of ITU-T SG16 WP3 and ISO/IEC JTC1/SC29/WG11, JCTVC-E700, WG11 No. m20235, 4$^{th}$ Meeting: Daegu, KR, Jan. 20-28, 2011, (http://phenix.int-evry.fr/jct/doc_end_user/current_document.php?id=2454).

Matthias Narroschke et al., "CE12 Subtest 1: Results for modified decisions for deblocking", Joint Collaborative Team on Video Coding (JCT-VC) of ITU-T SG16 WP3 and ISO/IEC JTC1/SC29/WG11, 7$^{th}$ Meeting: Geneva, CH, Nov. 21-30, 2011; URL: http://wftp3.itu.int/av-arch/jctvc-site/, Document: JCTVC-G590, Nov. 8, 2011, XP030110574.

Matthias Narroschke et al., "CE12: Results for decisions for deblocking", Joint Collaborative Team on Video Coding (JCT-VC) of ITU-T SG16 WP3 and ISO/IEC JTC1/SC29/WG11 6$^{th}$ Meeting: Torino, IT, Jul. 14-22, 2011, URL: http://wftp3.itu.int/av-arch/jctvc-site/, Document: JCTVC-F191, Jul. 13, 2011, XP030009214.

Chih-Wei Hsu et al., "Deblocking Filter with Reduced Pixel Line Buffers for LCU-based Processing", Joint Collaborative Team on Video Coding (JCT-VC) of ITU-T SG16 WP3 and ISO/IEC JTC1/SC29/WG11, 6$^{th}$ Meeting: Torino, IT, Jul. 14-22, 2011; URL: http://wftp3.itu.int/av-arch/jctvc-site/, Document: JCTVC-F053, Jul. 15, 2011, XP030009076.

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, 6$^{th}$ Meeting: Torino, IT, Jul. 14-22, 2011, Document: JCTVC-F803_d1.

Masaru Ikeda, et al., "CE12 Subset2: Parallel deblocking filter", Joint Collaborative Team on Video Coding (JCT-VC) of ITU-T SG16 WP3 and ISO/IEC JTC1/SC29/WG11, 5th Meeting: Geneva, CH, Mar. 16-23, 2011, Mar. 19, 2011, JCTVC-E181, pp. 1-9, URL, http://phenix.int-evry.fr/jct/doc_end_user/current_document.php?id=2107.

Summons to attend Oral Proceedings dated Oct. 18, 2016 issued in corresponding EP patent application No. 12769971.8.

Peter List et al: "Adaptive Deblocking Filter", IEEE Transactions on Circuits and Systems for Video Technology, IEEE Service Center, Piscataway, NJ, US, vol. 13, No. 7, Jul. 1, 2003 (Jul. 1, 2003), pp. 614-619, XP011221094, ISSN: 1051-8215, DOI: 10.1109/TCSVT.2003.815175.

* cited by examiner

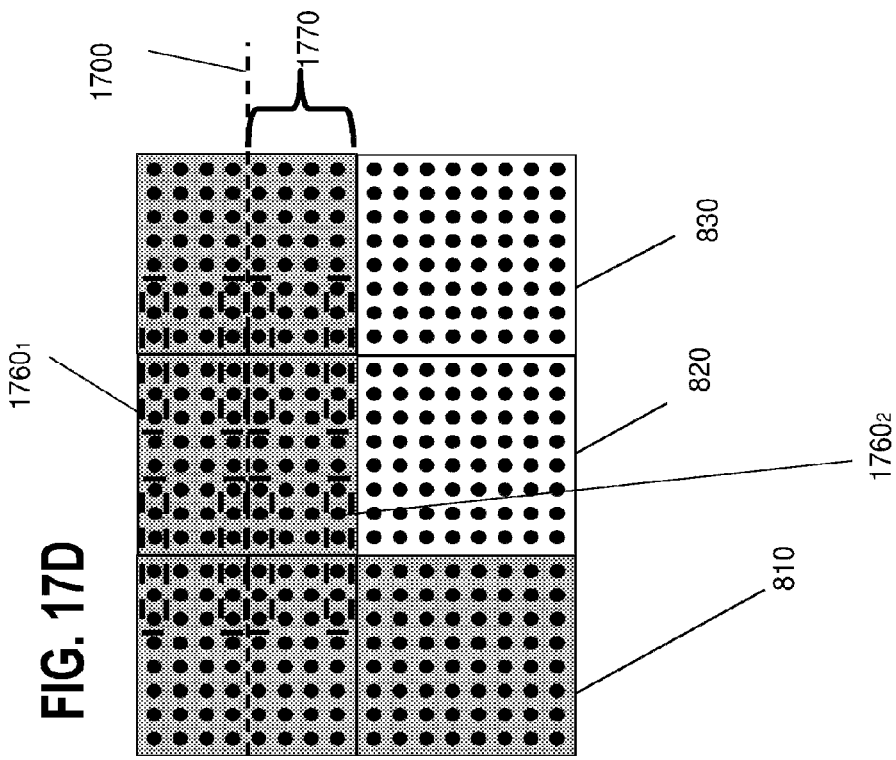
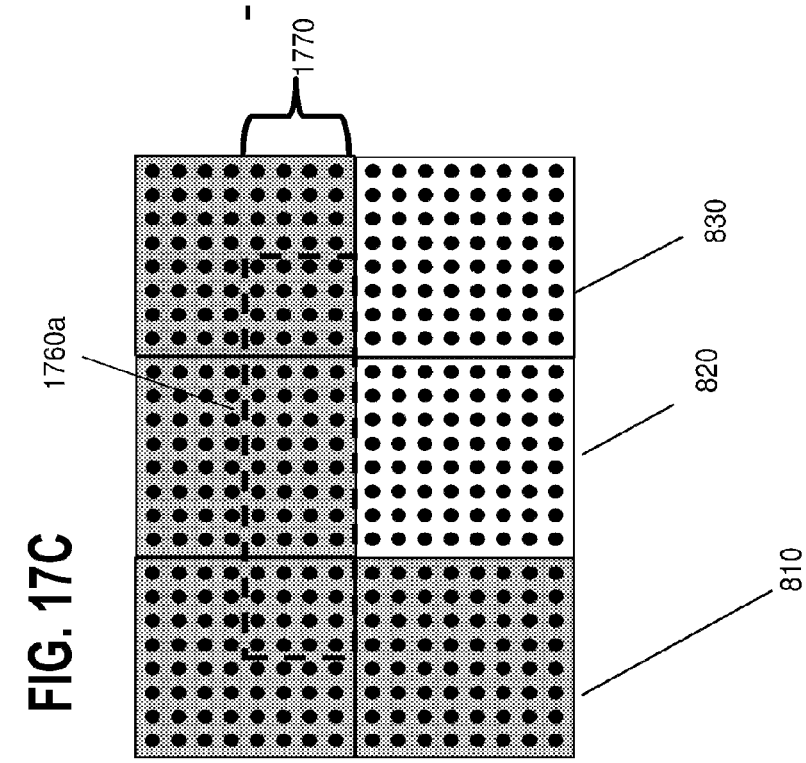
FIG. 17D
FIG. 17C

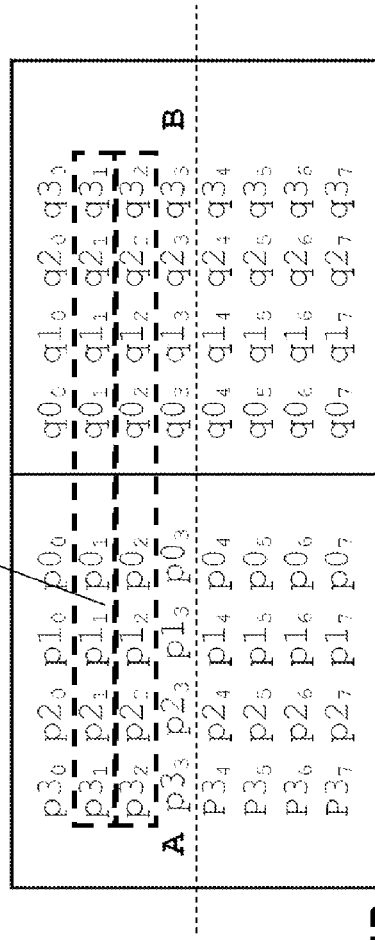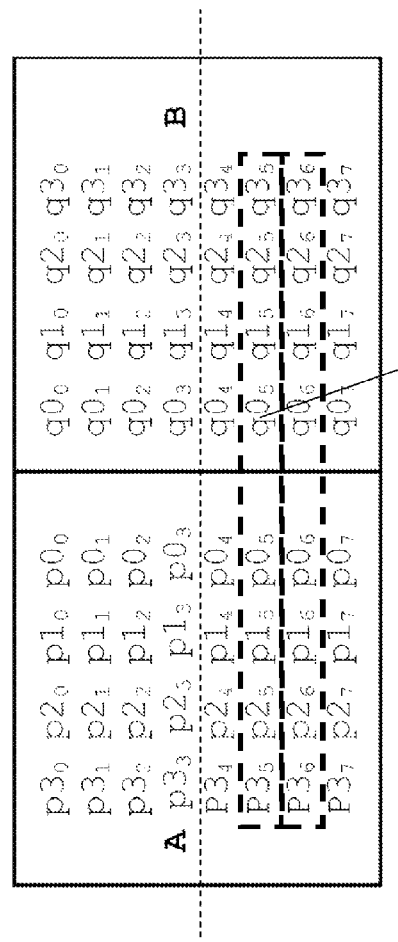
FIG. 21A
FIG. 21B

FIG. 22A

| | B |
|---|---|
| | q0₀ q1₀ q2₀ q3₀ |
| | q0₁ q1₁ q2₁ q3₁ |
| | q0₂ q1₂ q2₂ q3₂ |
| | q0₃ q1₃ q2₃ q3₃ |
| | q0₄ q1₄ q2₄ q3₄ |
| | q0₅ q1₅ q2₅ q3₅ |
| | q0₆ q1₆ q2₆ q3₆ |
| | q0₇ q1₇ q2₇ q3₇ |

(dashed box highlighting column q2 in rows 2–3)

| p3₀ p2₀ p1₀ p0₀ |
| p3₁ p2₁ p1₁ p0₁ |
| p3₂ p2₂ p1₂ p0₂ |
| p3₃ p2₃ p1₃ p0₃ |  A
| p3₄ p2₄ p1₄ p0₄ |
| p3₅ p2₅ p1₅ p0₅ |
| p3₆ p2₆ p1₆ p0₆ |
| p3₇ p2₇ p1₇ p0₇ |

— 2262 (pointing to p2₂, p1₂ region)
— 2265 (pointing to q1₅, q2₅ region)

(The figure shows two side-by-side block pairs A/B with the dashed highlight regions in analogous positions.)

FIG. 23A

$$\begin{array}{cccccccc|cccccccc}
p3_0 & p2_0 & p1_0 & p0_0 & & q0_0 & q1_0 & q2_0 & q3_0 \\
p3_1 & p2_1 & p1_1 & p0_1 & & q0_1 & q1_1 & q2_1 & q3_1 \\
p3_2 & p2_2 & p1_2 & p0_2 & & q0_2 & q1_2 & q2_2 & q3_2 \\
p3_3 & p2_3 & p1_3 & p0_3 & & q0_3 & q1_3 & q2_3 & q3_3 \\
p3_4 & p2_4 & p1_4 & p0_4 & & q0_4 & q1_4 & q2_4 & q3_4 \\
p3_5 & p2_5 & p1_5 & p0_5 & & q0_5 & q1_5 & q2_5 & q3_5 \\
p3_6 & p2_6 & p1_6 & p0_6 & & q0_6 & q1_6 & q2_6 & q3_6 \\
p3_7 & p2_7 & p1_7 & p0_7 & & q0_7 & q1_7 & q2_7 & q3_7 \\
\end{array}$$

Video stream (PID=0x1011, Primary video)
Audio stream (PID=0x1100)
Audio stream (PID=0x1101)
Presentation graphics stream (PID=0x1200)
Presentation graphics stream (PID=0x1201)
Interactive graphics stream (PID=0x1400)
Video stream (PID=0x1B00, Secondary video)
Video stream (PID=0x1B01, Secondary video)

| Corresponding standard | Driving frequency |
|---|---|
| MPEG-4 AVC | 500 MHz |
| MPEG-2 | 350 MHz |
| ⋮ | ⋮ |

Fig. 41 ved video signal. This is
LOW COMPLEX DEBLOCKING FILTER DECISIONS

CROSS REFERENCE TO RELATED APPLICATIONS

This is a continuation of application Ser. No. 15/184,037, filed Jun. 16, 2016, which is a continuation of application Ser. No. 14/755,414, filed Jun. 30, 2015, now U.S. Pat. No. 9,402,088, which is a divisional of application Ser. No. 14/200,911, filed Mar. 7, 2014, now U.S. Pat. No. 9,143,778, which is a continuation application of PCT Patent Application No. PCT/EP2012/067433 filed on Sep. 6, 2012, designating the United States of America, which is based on and claims priority of U.S. Provisional Patent Application No. 61/532,793 filed on Sep. 9, 2011. The entire disclosures of the above-identified applications, including the specifications, drawings and claims are incorporated herein by reference in their entirety.

FIELD

One or more exemplary embodiments disclosed herein relate generally to the filtering of images. In particular, one or more exemplary embodiments disclosed herein relate to deblocking filtering and to decisions as to whether enable or disable deblocking filtering for an image region.

BACKGROUND

At present, the majority of standardized video coding algorithms are based on hybrid video coding. Hybrid video coding methods typically combine several different lossless and lossy compression schemes in order to achieve the desired compression gain. Hybrid video coding is also the basis for ITU-T standards (H.26x standards such as H.261, H.263) as well as ISO/IEC standards (MPEG-X standards such as MPEG-1, MPEG-2, and MPEG-4). The most recent and advanced video coding standard is currently the standard denoted as H.264/MPEG-4 advanced video coding (AVC) which is a result of standardization efforts by joint video team (JVT), a joint team of ITU-T and ISO/IEC MPEG groups. This codec is being further developed by Joint Collaborative Team on Video Coding (JCT-VC) under a name High-Efficiency Video Coding (HEVC), aiming, in particular at improvements of efficiency regarding the high-resolution video coding.

A video signal input to an encoder is a sequence of images called frames, each frame being a two-dimensional matrix of pixels. All the above-mentioned standards based on hybrid video coding include subdividing each individual video frame into smaller blocks consisting of a plurality of pixels. The size of the blocks may vary, for instance, in accordance with the content of the image. The way of coding may be typically varied on a per block basis. The largest possible size for such a block, for instance in HEVC, is 64×64 pixels. It is then called the largest coding unit (LCU). In H.264/MPEG-4 AVC, a macroblock (usually denoting a block of 16×16 pixels) was the basic image element, for which the encoding is performed, with a possibility to further divide it in smaller subblocks to which some of the coding/decoding steps were applied.

Typically, the encoding steps of a hybrid video coding include a spatial and/or a temporal prediction. Accordingly, each block to be encoded is first predicted using either the blocks in its spatial neighborhood or blocks from its temporal neighborhood, i.e. from previously encoded video frames. A block of differences between the block to be encoded and its prediction, also called block of prediction residuals, is then calculated. Another encoding step is a transformation of a block of residuals from the spatial (pixel) domain into a frequency domain. The transformation aims at reducing the correlation of the input block. Further encoding step is quantization of the transform coefficients. In this step the actual lossy (irreversible) compression takes place. Usually, the compressed transform coefficient values are further compacted (losslessly compressed) by means of an entropy coding. In addition, side information necessary for reconstruction of the encoded video signal is encoded and provided together with the encoded video signal. This is for example information about the spatial and/or temporal prediction, amount of quantization, etc.

SUMMARY

Technical Problem

However, the deblocking filtering used in the conventional image coding method and image decoding method has a problem in that memory cannot be effectively used.

Solution to Problem

In one general aspect, the techniques disclosed here feature a method for deblocking filtering of image blocks of pixels, including the steps of: dividing each of a first and a second block that are separated by a first boundary into at least two segments along a line that is perpendicular to said first boundary, and judging whether or not to apply a deblocking filter to pixels adjacent to the first boundary of the first and the second block, wherein the judgment is individually performed for a pair of adjacent segments on both sides of the first boundary using sample pixels in the pair of adjacent segments, such that no pixels belonging to other segments are used in the judgment, and the division of the blocks into segments is performed such that a segment of a block includes all pixels of the block required for judging whether or not to apply a deblocking filter and/or a selection of the deblocking filter for deblocking pixels adjacent to a second boundary between said block and a third block, wherein the second boundary is perpendicular to the first boundary.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

A method for deblocking filtering of images according to one or more exemplary embodiments or features disclosed herein provide an efficient deblocking filtering approach wherein the efficiency of memory usage is improved.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 6A is a schematic drawing illustrating deblocking operations performed by a strong filter.

FIG. 6B is a schematic drawing illustrating deblocking operations performed by a weak filter.

FIGS. 17A-17D are schematic drawings illustrating a problem occurring in the parallel performance of the first and second kind of decisions of the flow chart of FIG. 7 for horizontal and vertical filtering, and the basic idea of overcoming the problem in accordance with the present disclosure.

FIGS. 19A and 19B are schematic drawings illustrating a specific example of a decision on whether to apply or not to apply a deblocking filter in accordance with an embodiment of the present disclosure.

FIGS. 20A and 20B are schematic drawings illustrating exemplary solutions of the decision for selecting an appropriate deblocking filter in accordance with an embodiment of the present disclosure.

FIGS. 21A and 21B are schematic drawings illustrating an alternative exemplary solution of the decision for selecting an appropriate deblocking filter in accordance with an embodiment of the present disclosure.

FIGS. 22A and 22B are schematic block diagrams illustrating a memory access problem occurring when performing the decision whether to apply or not to apply a deblocking filter.

FIGS. 23A and 23B are schematic drawings illustrating a solution of the memory access problem illustrated in FIGS. 22A and B.

FIG. 30 illustrates a structure of multiplexed data.

FIG. 41 shows an example of a look-up table in which video data standards are associated with driving frequencies.

DESCRIPTION OF EMBODIMENTS (Underlying Knowledge Forming Basis of the Present Disclosure)

Figure 1:
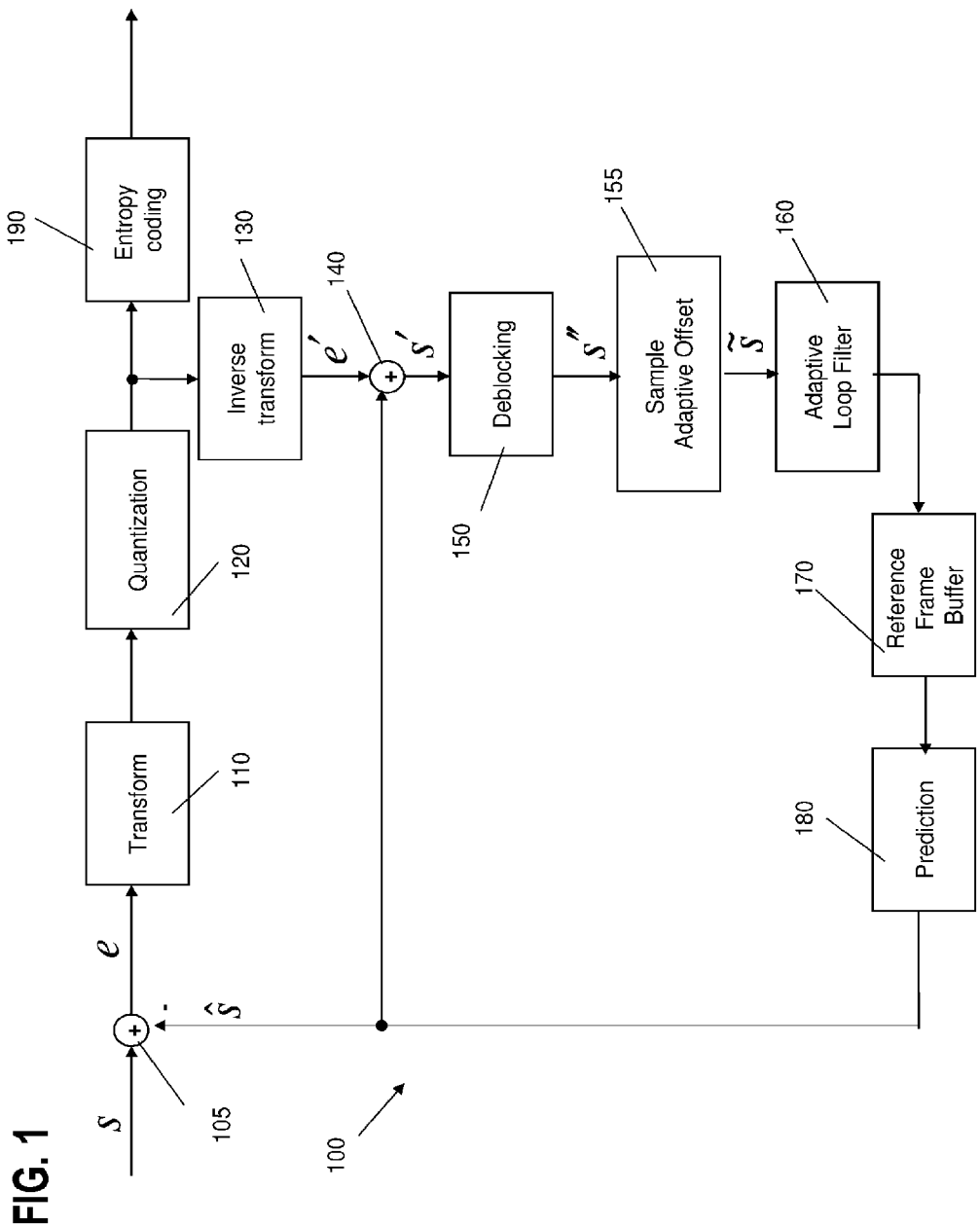
FIG. 1 is a block diagram illustrating an example of a video encoder.

FIG. 1 is an example of a typical H.264/MPEG-4 AVC and/or HEVC video encoder 100. A subtractor 105 first determines differences e between a current block to be encoded of an input video image (input signal s) and a corresponding prediction block ŝ, which is used as a prediction of the current block to be encoded. The prediction signal may be obtained by a temporal or by a spatial prediction 180. The type of prediction can be varied on a per frame basis or on a per block basis. Blocks and/or frames predicted using temporal prediction are called "inter"-encoded and blocks and/or frames predicted using spatial prediction are called "intra"-encoded. Prediction signal using temporal prediction is derived from the previously encoded images, which are stored in a memory. The prediction signal using spatial prediction is derived from the values of boundary pixels in the neighboring blocks, which have been previously encoded, decoded, and stored in the memory. The difference e between the input signal and the prediction signal, denoted prediction error or residual, is transformed 110 resulting in coefficients, which are quantized 120. Entropy encoder 190 is then applied to the quantized coefficients in order to further reduce the amount of data to be stored and/or transmitted in a lossless way. This is mainly achieved by applying a code with code words of variable length wherein the length of a code word is chosen based on the probability of its occurrence.

Within the video encoder 100, a decoding unit is incorporated for obtaining a decoded (reconstructed) video signal s'. In compliance with the encoding steps, the decoding steps include dequantization and inverse transformation 130. The so obtained prediction error signal e' differs from the original prediction error signal due to the quantization error, called also quantization noise. A reconstructed image signal s' is then obtained by adding 140 the decoded prediction error signal e' to the prediction signal ŝ. In order to maintain the compatibility between the encoder side and the decoder side, the prediction signal ŝ is obtained based on the encoded and subsequently decoded video signal which is known at both sides the encoder and the decoder.

Due to the quantization, quantization noise is superposed to the reconstructed video signal. Due to the block-wise coding, the superposed noise often has blocking characteristics, which result, in particular for strong quantization, in visible block boundaries in the decoded image. Such blocking artifacts have a negative effect upon human visual perception. In order to reduce these artifacts, a deblocking filter 150 is applied to every reconstructed image block. The deblocking filter is applied to the reconstructed signal s'. For instance, the deblocking filter of H.264/MPEG-4 AVC has the capability of local adaptation. In the case of a high degree of blocking noise, a strong (narrow-band) low pass filter is applied, whereas for a low degree of blocking noise, a weaker (broad-band) low pass filter is applied. The strength of the low pass filter is determined by the prediction signal ŝ and by the quantized prediction error signal e'. Deblocking filter generally smoothes the block edges leading to an improved subjective quality of the decoded images. Moreover, since the filtered part of an image is used for the motion compensated prediction of further images, the filtering also reduces the prediction errors, and thus enables improvement of coding efficiency.

After a deblocking filter, a sample adaptive offset 155 and/or adaptive loop filter 160 may be applied to the image including the already deblocked signal s". Whereas the deblocking filter improves the subjective quality, sample adaptive offset (SAO) and ALF aim at improving the pixel-wise fidelity ("objective" quality). In particular, SAO adds an offset in accordance with the immediate neighborhood of a pixel. The adaptive loop filter (ALF) is used to compensate image distortion caused by the compression. Typically, the adaptive loop filter is a Wiener filter with filter coefficients determined such that the mean square error (MSE) between the reconstructed s' and source images s is minimized. The coefficients of ALF may be calculated and transmitted on a frame basis. ALF can be applied to the entire frame (image of the video sequence) or to local areas (blocks). An additional side information indicating which areas are to be filtered may be transmitted (block-based, frame-based or quadtree-based).

In order to be decoded, inter-encoded blocks require also storing the previously encoded and subsequently decoded portions of image(s) in the reference frame buffer 170. An inter-encoded block is predicted 180 by employing motion compensated prediction. First, a best-matching block is found for the current block within the previously encoded and decoded video frames by a motion estimator. The best-matching block then becomes a prediction signal and the relative displacement (motion) between the current block and its best match is then signalized as motion data in the form of three-dimensional motion vectors within the side information provided together with the encoded video data. The three dimensions consist of two spatial dimensions and one temporal dimension. In order to optimize the prediction accuracy, motion vectors may be determined with a spatial sub-pixel resolution e.g. half pixel or quarter pixel resolution. A motion vector with spatial sub-pixel resolution may point to a spatial position within an already decoded frame where no real pixel value is available, i.e. a sub-pixel position. Hence, spatial interpolation of such pixel values is needed in order to perform motion compensated prediction. This may be achieved by an interpolation filter (in FIG. 1 integrated within Prediction block 180).

For both, the intra- and the inter-encoding modes, the differences e between the current input signal and the prediction signal are transformed 110 and quantized 120, resulting in the quantized coefficients. Generally, an orthogonal transformation such as a two-dimensional discrete cosine transformation (DCT) or an integer version thereof is employed since it reduces the correlation of the natural video images efficiently. After the transformation, lower frequency components are usually more important for image quality then high frequency components so that more bits can be spent for coding the low frequency components than the high frequency components. In the entropy coder, the two-dimensional matrix of quantized coefficients is converted into a one-dimensional array. Typically, this conversion is performed by a so-called zig-zag scanning, which starts with the DC-coefficient in the upper left corner of the two-dimensional array and scans the two-dimensional array in a predetermined sequence ending with an AC coefficient in the lower right corner. As the energy is typically concentrated in the left upper part of the two-dimensional matrix of coefficients, corresponding to the lower frequencies, the zig-zag scanning results in an array where usually the last values are zero. This allows for efficient encoding using run-length codes as a part of/before the actual entropy coding.

The H.264/MPEG-4 H.264/MPEG-4 AVC as well as HEVC includes two functional layers, a Video Coding Layer (VCL) and a Network Abstraction Layer (NAL). The VCL provides the encoding functionality as briefly described above. The NAL encapsulates information elements into standardized units called NAL units according to their further application such as transmission over a channel or storing in storage. The information elements are, for instance, the encoded prediction error signal or other information necessary for the decoding of the video signal such as type of prediction, quantization parameter, motion vectors, etc. There are VCL NAL units containing the compressed video data and the related information, as well as non-VCL units encapsulating additional data such as parameter set relating to an entire video sequence, or a Supplemental Enhancement Information (SEI) providing additional information that can be used to improve the decoding performance.

Figure 2:
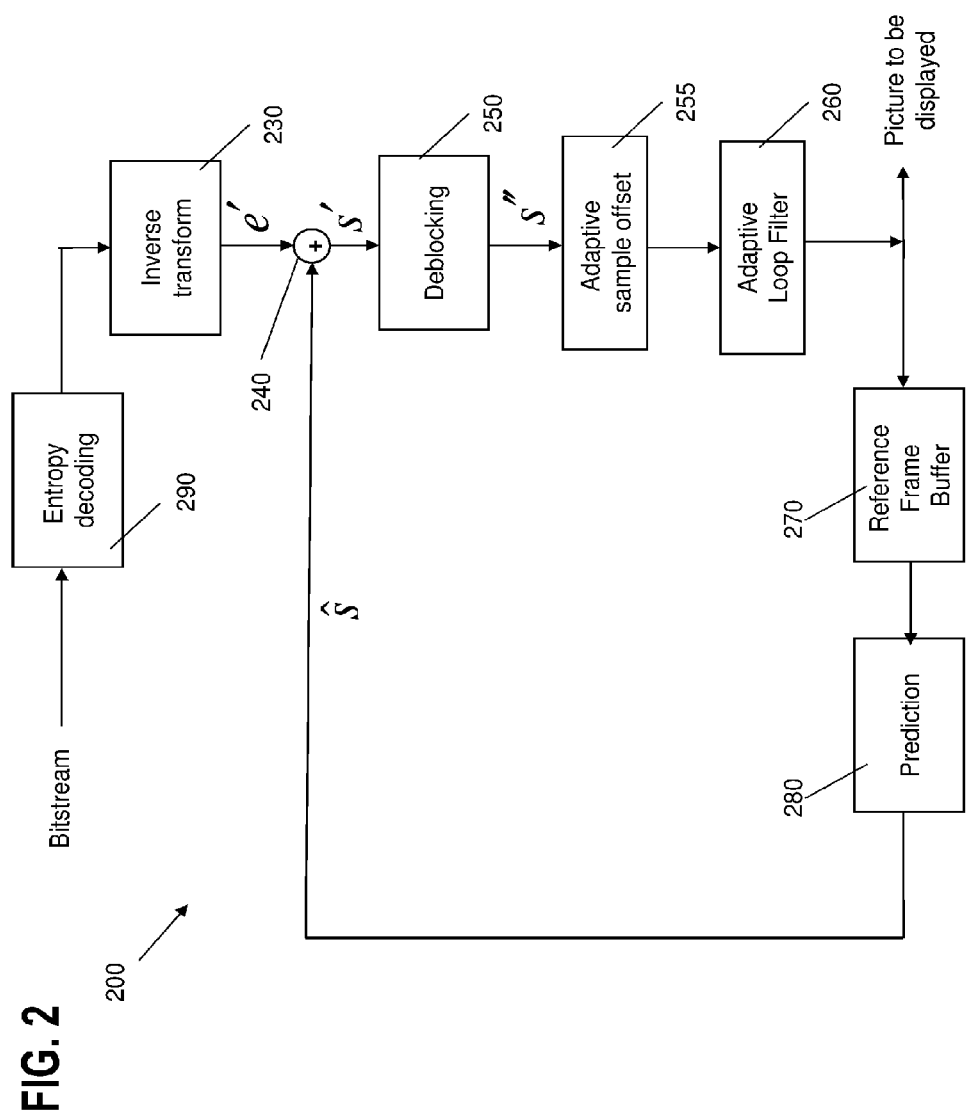
FIG. 2 is a block diagram illustrating an example of a video decoder.

FIG. 2 illustrates an example decoder 200 according to the H.264/MPEG-4 AVC or HEVC video coding standard. The encoded video signal (input signal to the decoder) first passes to entropy decoder 290, which decodes the quantized coefficients, the information elements necessary for decoding such as motion data, mode of prediction etc. The quantized coefficients are inversely scanned in order to obtain a two-dimensional matrix, which is then fed to inverse quantization and inverse transformation 230. After inverse quantization and inverse transformation 230, a decoded (quantized) prediction error signal e' is obtained, which corresponds to the differences obtained by subtracting the prediction signal from the signal input to the encoder in the case no quantization noise is introduced and no error occurred.

The prediction signal is obtained from either a temporal or a spatial prediction 280. The decoded information elements usually further include the information necessary for the prediction such as prediction type in the case of intra-prediction and motion data in the case of motion compensated prediction. The quantized prediction error signal in the spatial domain is then added with an adder 240 to the prediction signal obtained either from the motion compensated prediction or intra-frame prediction 280. The reconstructed image s' may be passed through a deblocking filter 250, sample adaptive offset processing 255, and an adaptive loop filter 260 and the resulting decoded signal is stored in the memory 270 to be applied for temporal or spatial prediction of the following blocks/images.

Figure 3:
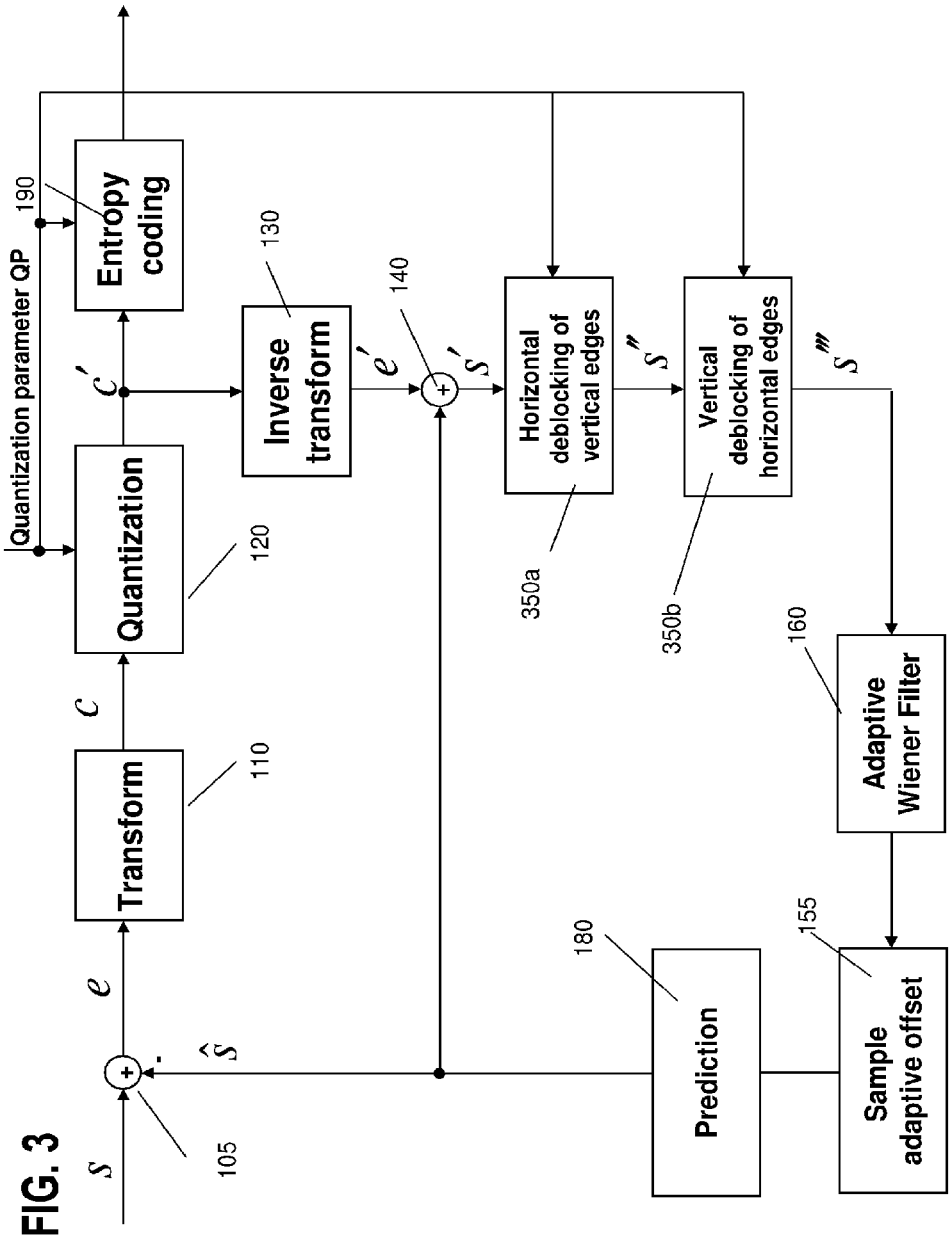
FIG. 3 is another block diagram illustrating an example of a video encoder.

A further illustration of an exemplary hybrid video encoder is shown in FIG. 3. The encoder of FIG. 3 differs from the encoder of FIG. 1 in that deblocking filter 150 of FIG. 1 has been subdivided in a filter 350a for horizontal deblocking of vertical edges and a filter 350b for vertical deblocking of horizontal edges. Filter 350a is applied to the reconstructed signal S' being the output of adder 140. The output of filter 350b, i.e. an image with deblocked vertical edges as denoted S" and input into filter 350b. The output signal of filter 350b, i.e. a vertically and horizontally deblocked image, and has been denoted Sm. Moreover, FIG. 3 explicitly shows the quantization parameter QP to be input into entropy encoder 190, horizontal deblocking filter 350a and vertical deblocking filter 350b.

The remaining blocks of FIG. 3 correspond to respective blocks of FIG. 1, and like features have been denoted by the same reference numerals in FIG. 3 and FIG. 1. In FIG. 3, the adapted loop filter 160 has been explicitly described as a Wiener filter, and the blocks 155 (SAO) and 160 (ALF) have been interchanged. The sequence of these steps is, however, not essential for the present disclosure. Moreover, reference frame buffer 170 has not been explicitly shown in FIG. 3.

In view of the close analogy of the respective features of the encoder of FIG. 1 and the decoder of FIG. 2, a person skilled in the art is aware of how to modify FIG. 2 in order to illustrate a decoder wherein horizontal and vertical deblocking in two subsequent steps is made explicit. A respective figure has therefore been omitted herein.

When compressing and decompressing an image, the blocking artifacts are typically the most annoying artifacts for the user. The deblocking filtering helps to improve the perceptual experience of the user by smoothing the edges between the blocks in the reconstructed image. One of the difficulties in deblocking filtering is to correctly decide between an edge caused by blocking due to the application of a quantizer and between edges which are part of the coded signal. Application of the deblocking filter is only desirable if the edge on the block boundary is due to compression artifacts. In other cases, by applying the deblocking filter, the reconstructed signal may be despaired, distorted. Another difficulty is the selection of an appropriate filter for deblocking filtering. Typically, the decision is made between several low pass filters with different frequency responses resulting in strong or weak low pass filtering. In order to decide whether deblocking filtering is to be applied and to select an appropriate filter, image data in the proximity of the boundary of two blocks are considered.

For instance, quantization parameters of the neighboring blocks may be considered. Alternatively or in addition, prediction modes such as intra or inter may be considered. Another possibility is to evaluated quantized prediction error coefficients, for instance, how many of them are quantized to zero. Reference frames used for the motion compensated prediction may also be indicative for selection of the filter, for instance, whether the same reference frames are used for prediction of the current block and the neighboring blocks. The decision may also be based on motion vectors used for the motion compensated prediction and on whether the motion vectors for the current block and for the neighboring blocks are the same or better they defer. The decision may involve spatial positions of the samples such as distance to the block patch.

For instance, H.264/MPEG-4 AVC evaluates the absolute values of the first derivation (derivative) in each of the two neighboring blocks, the boundary of which is to be deblocked. In addition, absolute values of the first derivative across the edge between the two blocks are evaluated, as described, for instance in H.264/MPEG-4 AVC standard, Section 8.7.2.2. A similar approach is also described in US 2008/0025632 A1. The decision is taken for all pixels to be filtered based on the same criterion and the selection is performed for the entire block. HEVC employs a similar mechanism, however, uses also a second derivative.

According to these approaches, for actual deblocking, a decision as to whether to deblock is taken for all edges of a block potentially to be deblocked. Further, if deblocking is enabled, for each individual line, a decision is taken with respect to the kind of filter to be applied. These decisions are taken based on non-deblocked pixel samples. Therefore, the decisions for both deblocking directions have to be taken before actually applying the deblocking filters the for both the horizontal filtering of vertical edges and the vertical filtering of horizontal edges.

The result is a delay of the first deblocking filter to be applied (for instance, horizontal filtering). In addition, the result of the filter on/filter off decision needs to be stored. Alternatively, additional line memory would be required in order to delay the decision taking for deblocking in the second direction (for instance, vertical). Since line memory is very expensive, this results in increased cost. Given the existence of these problems with the existing technology, it would be advantageous to provide an efficient deblocking filtering approach wherein the efficiency of memory usage is improved. According to an exemplary embodiment disclosed herein, a method for deblocking filtering of image blocks of pixels, comprising the steps of: dividing each of a first and a second block that are separated by a first boundary into at least two segments along a line that is perpendicular to said first boundary, and judging whether or not to apply a deblocking filter to pixels adjacent to the first boundary of the first and the second block, wherein the judgment is individually performed for a pair of adjacent segments on both sides of the first boundary using sample pixels in the pair of adjacent segments, such that no pixels belonging to other segments are used in the judgment, and the division of the blocks into segments is performed such that a segment of a block includes all pixels of the block required for judging whether or not to apply a deblocking filter and/or a selection of the deblocking filter for deblocking pixels adjacent to a second boundary between said block and a third block, wherein the second boundary is perpendicular to the first boundary.

It is the particular approach of the present disclosure to perform the decision on whether to apply or skip the deblocking filter for a boundary between two blocks based on a segmentation of each block into at least two segments along a line that is perpendicular to the block boundary, rather than based on complete blocks. The segments are defined in such a way that a segment includes all those pixels which are stored anyway since they are needed for the decision on whether to apply or skip the deblocking filtering and/or the selection of an appropriate filter for another block boundary in a perpendicular direction, adjacent to the respective segment.

According to an aspect of the present disclosure, a method is provided for deblocking filtering of image blocks of pixels. The method comprises the steps of dividing each of a first and a second block that are separated by first boundary into at least two segments along a line that is perpendicular to the first boundary, and judging whether or not to apply a deblocking filter to pixels adjacent to the first boundary of the first and the second block. The judgment is individually performed for a pair of adjacent segments on both sides of the first boundary using sample pixels in the pair of adjacent segments, such that no pixels belonging to other segments are used in the judgment. The division of the blocks into segments is performed in such a way that a segment of a block includes all pixels of the block required for judging whether or not to apply a deblocking filter and/or a selection of the deblocking filter for deblocking pixels adjacent to a second boundary between said block and a third block, wherein the second boundary is perpendicular to the first boundary.

According to another aspect of the present disclosure, a device is provided for deblocking filtering of image blocks of pixels. The device comprises a segmentation unit for dividing each of a first and a second block that are separated by the first boundary into at least two segments along a line that is perpendicular to the first boundary. The device further comprises a judging unit for judging whether or not to apply a deblocking filter to pixels adjacent to the first boundary of the first and the second block. The judging unit performs the judgment individually for a pair of adjacent segments on both sides of the first boundary using sample pixels in the pair of adjacent segments, in such a way that no pixels belonging to other segments are used in the judgment. The segmentation unit performs the division of the blocks into segments so that a segment of a block includes all pixels of the block required for judging whether or not to apply a deblocking filter and/or a selection of the deblocking filter for deblocking pixels adjacent to a second boundary between the block and a third block, wherein the second boundary is perpendicular to the first boundary.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

The problem underlying the present disclosure is based on the observation that the conventional decision techniques require an excessive memory capacity in order to perform all decisions and the actual filtering processing in the desired order, as will be detailed below. In order to decrease memory cost, in accordance with the present disclosure, a segmentation of the blocks for performing the decision processing is performed, so as to minimize MIC memory requirements. In accordance with a further particular aspect, a decreasing overall calculation complexity is further addressed.

FIG. 4 shows an example of an application of a deblocking filter (such 150, 250, 350a and 350b) referred to in the description of FIGS. 1, 2 and 3, respectively. Such a deblocking filter may decide for each sample at a block boundary whether it is to be filtered or not. When it is to be filtered, a low pass filter is applied. The aim of this decision is to filter only those samples, for which the large signal change at the block boundary results from the quantization applied in the block-wise processing as described in the background art section above. The result of this filtering is a smoothed signal at the block boundary. The smoothed signal is less annoying to the viewer than the blocking artifact. Those samples, for which the large signal change at the block boundary belongs to the original signal to be coded, should not be filtered in order to keep high frequencies and thus the visual sharpness. In the case of wrong decisions, the image is either unnecessarily smoothened or remains blocky.

Figure 4B:
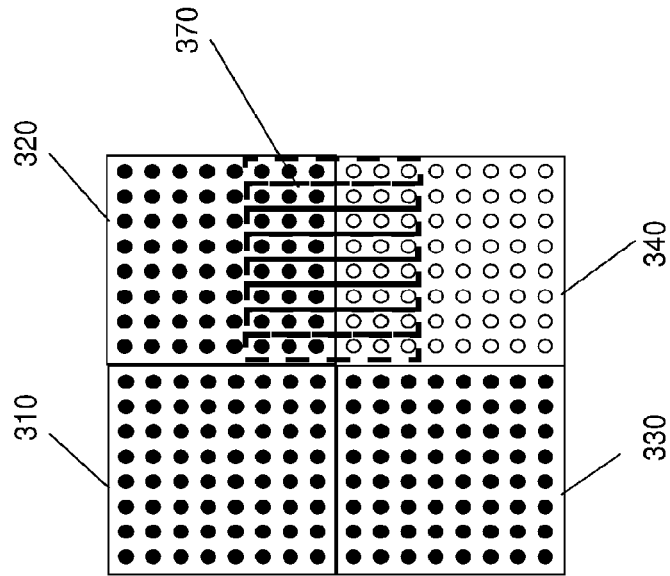
FIG. 4B is a schematic drawing illustrating the application of a vertical deblocking filter.
Figure 4A:
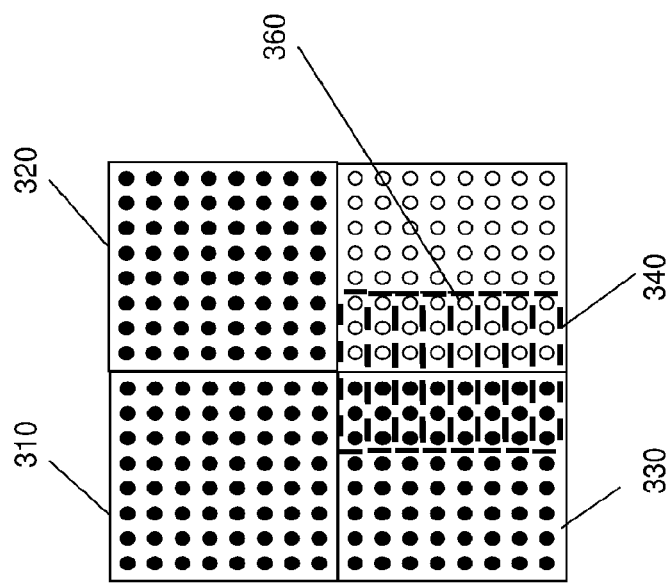
FIG. 4A is a schematic drawing illustrating the application of a horizontal deblocking filter.

FIG. 4A illustrates decision on a vertical boundary (to filter or not to filter with a horizontal deblocking filter) and FIG. 4B illustrates decision on a horizontal boundary (to filter or not with a vertical deblocking filter). In particular, FIG. 4A shows a current block 340 to be decoded and its already decoded neighboring blocks 310, 320, and 330. For the pixels 360 in a line, the decision is performed. Similarly, FIG. 4B shows the same current block 340 and decision performed for the pixels 370 in a column.

Figure 5:
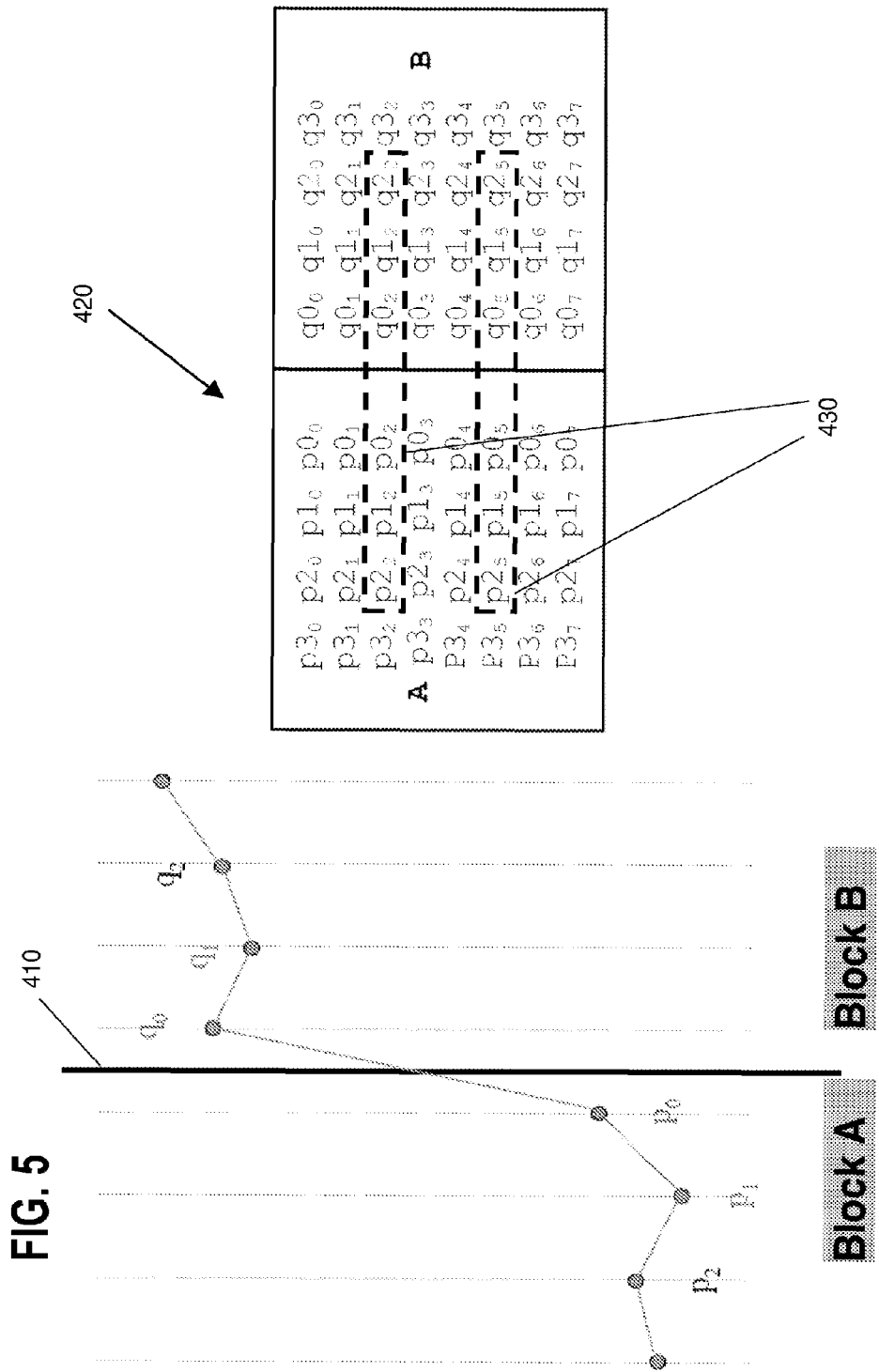
FIG. 5 is a schematic drawing illustrating a decision whether to apply or not to apply deblocking and a selection of a deblocking filter.

The judgment on whether to apply the deblocking filter may be performed as follows, similarly to H.264/MPEG-4 AVC. Let us take a line of six pixels 360, the first three pixels p2, p1, p0 of which belong to a left neighboring block A 330 and the following three pixels q0, q1, and q2 of which belong to the current block B 340 as also illustrated in FIG. 5. Line 410 illustrates a boundary between the blocks A and B. Pixels p0 and q0 are the pixels of the left neighbor A and of the current block B, respectively, located directly adjacent to each other. Pixels p0 and q0 are filtered by the deblocking filtered for instance, when the following conditions are fulfilled:

$$|p_0-q_0|<\alpha_{H264}(QP_{New}),$$

$$|p_1-p_0|<\beta_{H264}(QP_{New}),$$

$$|q_1-q_0|<\beta_{H264}(QP_{New}),$$

wherein, in general, $\beta_{H264}(QP_{New})<\alpha_{H264}(QP_{New})$. These conditions aim at detecting whether the difference between p0 and q0 stems from blocking artifacts. They correspond to evaluation of the first derivation within each of the blocks A and B and between them.

Pixel p1 is filtered if, in addition to the above three conditions, also the following condition is fulfilled:

$$|p_2-p_0|<\beta_{H264}(QP_{New}),$$

Pixel q1 is filtered, for instance, if in addition to the above first three conditions also the following condition is fulfilled:

$$|q_2-q_0|<\beta_{H264}(QP_{New}),$$

These conditions correspond to a first derivation within the first block and a first derivation within the second block, respectively. In the above conditions, QP denotes quantization parameter indicating the amount of quantization applied, and $\beta$, $\alpha$ are scalar constants. In particular, $QP_{New}$ is quantization parameter derived based on quantization parameters $QP_A$ and $QP_B$ applied to the respective first and second block A and B as follows:

$$QF_{New}=(QP_A+QP_B+1)>>1,$$

wherein ">>n" denoted right shift by n bits (in the above formula: one bit).

The above conditions correspond to evaluating of the first derivative within the blocks. The decision may be performed only for a selected line or selected lines of a block, while the filtering of pixels accordingly is then performed for all lines 360. An example 420 of lines 430 involved in decision in compliance with HEVC is illustrated in FIG. 5. Based on lines 430, the decision whether to filter entire block is carried out. Another example of deblocking filtering in HEVC can be found in JCTVC-E603 document, Section 8.6.1, of JTC-VC, of ITU-T SG16 WP3 and ISO/IEC JTC1/SC29/WG11, freely available under http://wftp3.itu.int/av-arch/jctvc-site/.

Accordingly, in HEVC the two lines 430 are used to decide whether and how the deblocking filtering is to be applied. This decision step is labeled first decision step D1 throughout this specification. The example 420 assumes the evaluating of the third (with index 2) and the sixth (with index 5) line for the purpose of horizontally blocking filtering. In particular, the second derivative within each of the blocks is evaluated resulting in the obtaining of measures $d_p$ and $d_q$ as follows:

$$d_{p2}=|p2_2-2\cdot p1_2+p0_2|$$

$$d_{q2}=|q2_2-2\cdot q1_2+q0_2|$$

$$d_{p5}=|p2_5-2\cdot p1_5+p0_5|$$

$$d_{q5}=|q2_5-2\cdot q1_5+q0_5|$$

$$d_p=d_{p2}+d_{p5}$$

$$d_q=d_{q2}+d_{q5}$$

The pixels p belong to block A and pixels q belong to block B. The first number after p or q denotes column index and the following number in subscript denotes row number within the block. The deblocking for all eight lines illustrated in the example 420 is enabled when the following condition is fulfilled:

$$d=d_p+d_q<\beta(QP).$$

If the above condition is not fulfilled, no deblocking is applied. In the case that deblocking is enabled, the filter to be used for deblocking is determined in a subsequent decision step labeled second decision step D2 throughout the present specification. This determination is based on the evaluation of the first derivative between the blocks A and B. In particular, for each line i, wherein i is an integer between 0 and 7, it is decided whether a strong or a weak low pass filter is to be applied. A strong filter is elected if the following condition is fulfilled.

$$|p3_i-p0_i|+|q3_i-q0_i|<(\beta(QP)>>3) \wedge$$

$$d<(\beta(QP)>>2) \wedge$$

$$|p0_i-q0_i|<((t_c(QP)\cdot 5+1)>>1),$$

In compliance with the HEVC model "the strong filter" filters samples $p2_i$, $p1_i$, $p0_i$, $q0_i$, $q1_i$, $q2_i$ using $p3_i$, $p2_i$, $p1_i$, $p0_i$, $q0_i$, $q1_i$, $q2_i$, $q3_i$, whereas a "weak filter" filters samples $p1_i$, $p0_i$, $q0_i$, $q1_i$, using $p2_i$, $p1_i$, $p0_i$, $q0_i$, $q1_i$, $q2_i$. In the above conditions, parameters $\beta$ and $t_c$ are both functions of the quantization parameter $QP_e$ which may be set for a slice of the image or the like. The values of $\beta$ and $t_c$ are typically derived based on QP using lookup tables.

FIG. 6 explains in more detail exemplary solutions for strong filter operations and weak filter operations in compliance with the H264/MPEG-4 AVC standard (implemented in HEVC software model HM4.0).

Figures 6A, 6B:
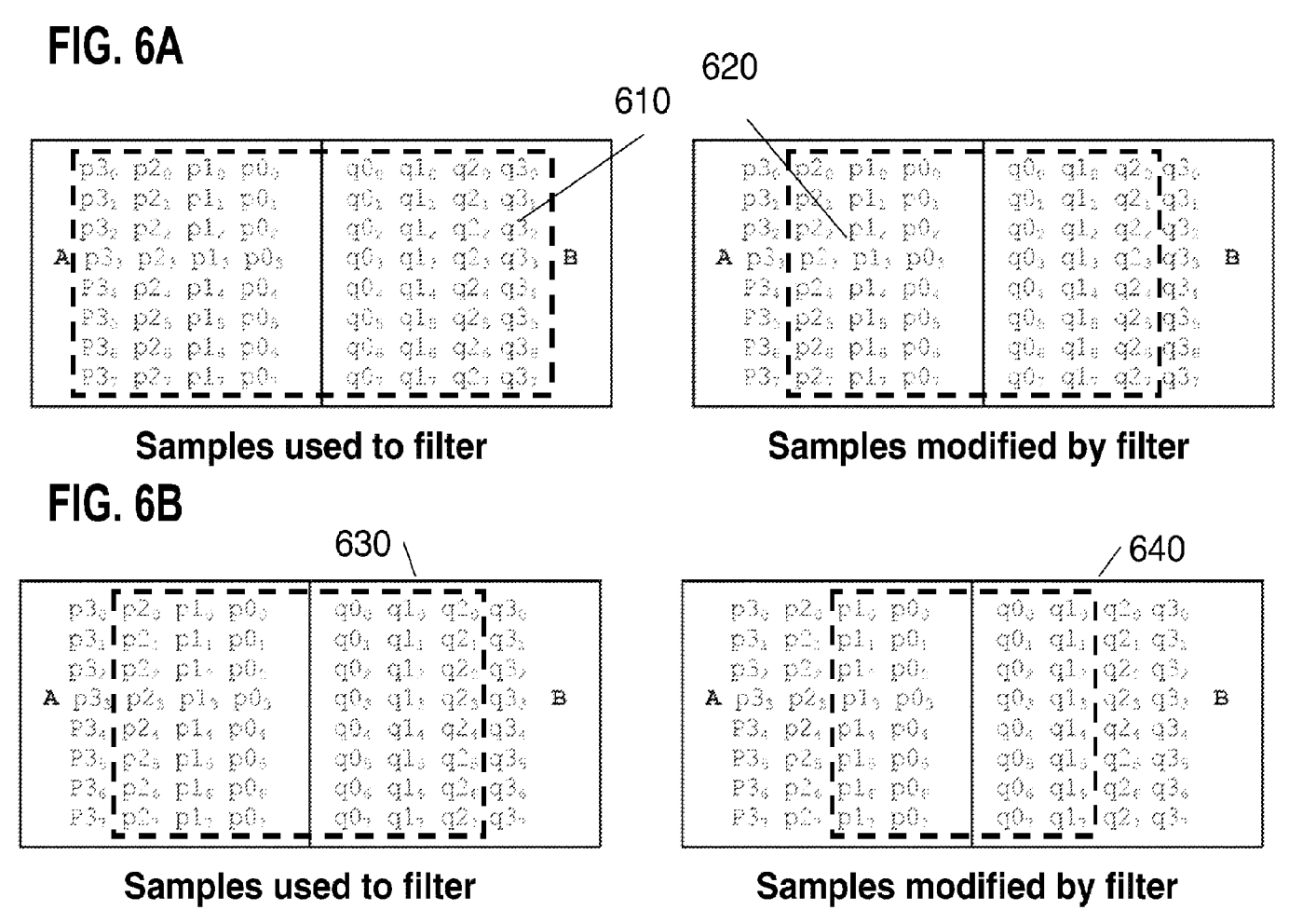

In FIG. 6A the left hand drawing illustrates the samples used for horizontally filtering a vertical edge in a strong filter. The right hand drawing of FIG. 6A illustrates the samples that are modified by the filter. As can be seen from the drawing, in the given example samples corresponding to the 4 pixels most adjacent to both sides of the boundary, denoted by reference numeral 610, are used for the filtering. Actually modified are only those 3 pixels closest to the boundary from both sides denoted by 620 in the left hand drawing of FIG. 6A. Actually, filtering is performed in accordance with the following formulae.

$$p0_i'=\text{Clip}((p2_i+2\cdot p1_i+2\cdot p0_i+2\cdot q0_i+q2_i+4)>>3)$$

$$p1_i'=\text{Clip}((p2_i+p1_i+p0_i+q0_i+2)>>2)$$

$$p2_i'=\text{Clip}((2\cdot p3_i+3\cdot p2_i+p1_i+p0_i+q0_i+4)>>3)$$

$$q0_i'=\text{Clip}((q2_i+2\cdot q1_i+2\cdot q0_i+2\cdot p0_i+p2_i+4)>>3)$$

$$q1_i'=\text{Clip}((q2_i+q1_i+q0_i+p0_i+2)>>2)$$

$$q2_i'=\text{Clip}((2\cdot q3_i+3\cdot q2_i+q1_i+q0_i+p0_i+4)>>3)$$

The function Clip(x) is defined as follows:

$$\text{Clip}(x) = \begin{cases} 0; & x < 0 \\ \text{max\_allowed\_value}; & x > \text{max\_allowed\_value} \\ x; & \text{else} \end{cases}$$

Hereby, max_allowed_value is a maximum value, which x can have. In the case of PCM coding with k bit samples, the maximum value would be max_allowed_value=$2^k-1$. For instance, in the case of PCM coding with 8 bit samples, the maximum value would be max_allowed_value=255. In the case of PCM coding with 10 bit samples, the maximum value would be max_allowed_value=1023.

As can be seen from the above equations, filtering is performed individually for each line (only a single line index i=0, 1, 2, 3, 4, 5, 6, or 7) is employed in each of the formulae where pixels are modified by a filter (indicated by a prime after the filter number). While no modified pixels are calculated for $p3_i$ and $q3_i$, respectively, it can be seen from the equations for $p2'_i$ and $q2'_i$, respectively that $p3_i$ and $q3_i$ occur on the right hand sides of the respective calculation equations.

As can be seen from FIG. 6B, the three closest pixels to the boundary from both sides are used for filtering by the weak filter (samples 630 in the left hand side scheme). Actually modified are the only the two closest neighbours to the boundary (samples 640 on the right hand side of FIG. 6B. The calculation processing for the weak filtering substantially differs from the calculation in the case of strong filtering and includes further decisions. Firstly, a discrimination value Δ is calculated according to equation $$\Delta = (9 \cdot (q0_i - p0_i) - 3 \cdot (q1_i - p1_i) + 8) >> 4$$

on which the decisions are based.

Subsequently in a third decision step D3 it is decided whether to perform filtering at all. In accordance with the third decision, filtering is only applied to pixel samples 640, if the condition $|\Delta| < 10 \cdot t_c$ is fulfilled.

In the case that the condition is fulfilled, the closest pixels to the boundary on both sides are filtered in accordance with equations $$p0_i' = \text{Clip}(p0_i + \Delta_1)$$

$$q0_i' = \text{Clip}(q0_i - \Delta_1),$$

wherein $$\Delta = \text{Clip3}(-t_c, t_c, \Delta)$$

The function Clip(x) is defined as above. The function Clip3(x) is defined as follows:

$$\text{Clip3}(x, a, b) = \begin{cases} a; & x < a \\ b; & x > b \\ x; & \text{else} \end{cases}$$

After filtering samples p0 and q0, a fourth decision D4 is performed as to whether to also filter the next closest pixel samples from the viewpoint of the boundary, $p1_i$ and $q1_i$. The fourth decision D4 is performed separately for both sides of the boundary, i.e. for the pixels $p1_i$ belong to block A of FIG. 6B and pixels $q1_i$ of block B of FIG. 6B.

The fourth decision for pixels $p1_i$ is based on the above introduced parameter $d_p$. If the condition $d_p < (\beta/6)$ is fulfilled, filtering is performed in accordance with $p1_i' = \text{Clip}(p1_i + \Delta_{2p})$, wherein $\Delta_{2p} = \text{Clip3}(-t_{c2}, t_{c2}, (((p2_i + p0_i + 1) >> 1) - p1_i + \Delta_1) >> 1)$.

Decision D4 for pixels $q_i$ of block B is performed if condition $d_q < (\beta/6)$ is fulfilled. Filtering is performed in accordance with $q1_i' = \text{Clip}(q1_i + \Delta_{2q})$, wherein $\Delta_{2q} = \text{Clip3}(-t_{c2}, t_{c2}, (((q2_i + q0_i + 1) >> 1) - q1_i + \Delta_1) >> 1)$.

In the foregoing, parameter $t_{c2}$ is defined in compliance with $t_{c2} = t_c >> 1$.

It is noted that the foregoing filtering procedure, although described by way of example for horizontal filtering of vertical edges is equally applicable to vertical filtering of horizontal edges by respectively interchanging horizontal and vertical directions and rows with columns. Moreover, throughout the specification, a convention is applied, according to which the term "line" means either column or row.

Figure 7:
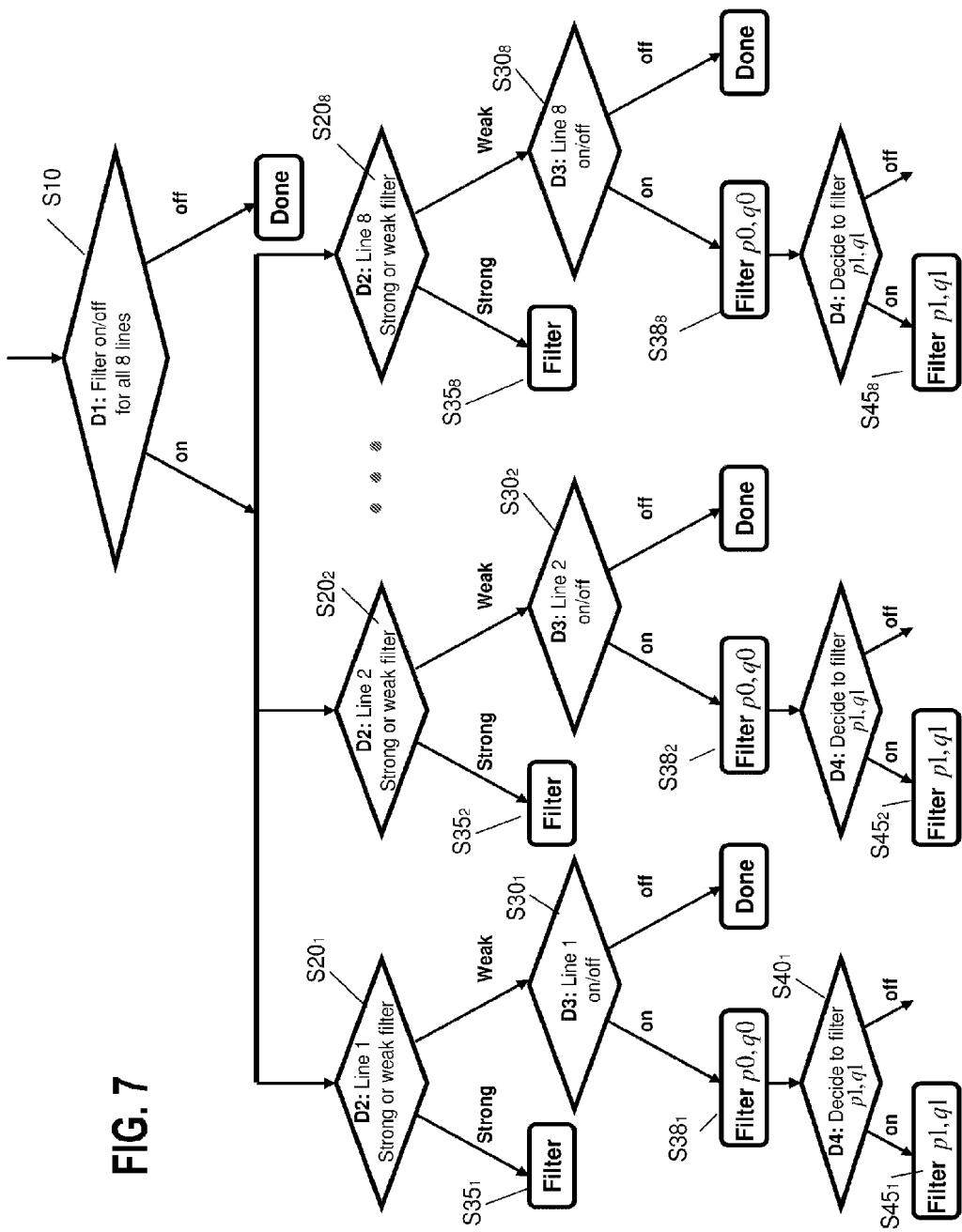
FIG. 7 is a flow diagram illustrating a sequence of deblocking decisions to be subsequently taken from an exemplary block of eight rows/columns.

FIG. 7 is an overall flow chart illustrating the sequence of decision steps D1, D2, D3 and D4 for the particular case of 8×8 blocks, i.e. blocks having eight lines to be filtered.

As can be seen from FIG. 7, in step S10 it is decided in a single decision for all eight lines whether deblocking filtering is applied or not. If the decision is made not to apply deblocking (filter OFF), the processing ends. If deblocking is applied (filter ON), the filtering processing is individually performed for each of the lines (indicated by a subscript j, j=1, 2, ..., 8) for each of the following steps S20; to S45j. For simplicity, in the following explanation the respective subscript j has been omitted. Firstly, in step S20, it is decided for each individual line j whether to apply a strong or the weak filter (decision D2). If it is decided to apply a strong filter, in following step S35, a strong filter is applied, as described above with reference to FIG. 6A. In the contrary case, when it is decided to apply a weak filter, processing proceeds to further decision step S30, wherein decision D3 is performed for the individual line j. If it is decided not to apply filtering in decision D3, processing ends. In the contrary case, filtering of the pixels of the respective line j closest to the boundary, p0 and q0, is performed in step S38, as described above with reference to FIG. 6B. Subsequently, in step S40, it is further decided whether also p1 and q1 (next closest to the boundary) are to be filtered. If not, the processing ends. If the decision is positive, processing proceeds to step S45, wherein modified pixels p1' and q1' are calculated. Details of the processing of Steps S30, S38, S40 and S45 are described in accordance with the present example in connection with FIG. 6B.

Figure 8:
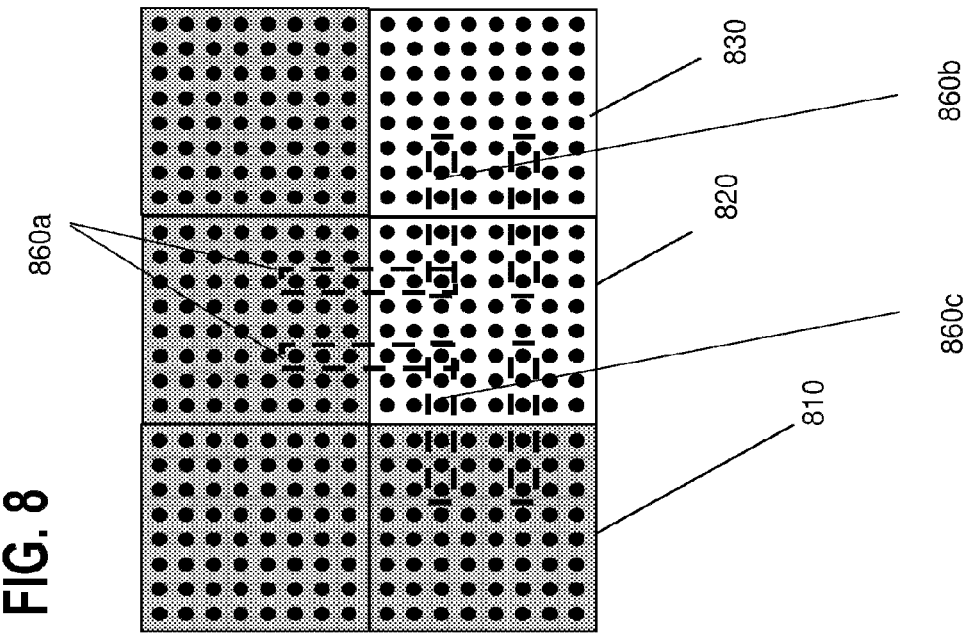
FIG. 8 is a schematic drawing illustrating samples of pixels used to perform a first kind of decisions in the flow chart of FIG. 7.

FIG. 8 illustrates by way of example the pixel samples used to perform the decisions D1 (i.e. the decision whether or not to apply deblocking at all to a particular boundary between two blocks). The drawing shows two rows of blocks. In each row, a previous block already decoded 810, a current block to be decoded 820 and a next block to be decoded 830 are illustrated. Since decision D1 is performed on the non-deblocked image blocks, the illustrated samples correspond to signal S' of FIG. 3.

As described above, the third and sixth lines (labeled 2 and 5) in the filtering direction perpendicular to the edge to be filtered employed for decision D1. Specifically, samples 860a include two columns used to perform decision D1 for deciding whether to filter the boundary between current block 820 and the block vertically above block 820. Sample 860b illustrates two rows used to perform the decision D1 whether or not to horizontally filter the vertical edge between current block 820 and next block 830. Similarly, sample 860c illustrates two rows used to perform decision D1 for a boundary between previous block 810 and current block 820. As explained above, for performing the decision in each of the sampled lines three pixels are required, counted from each side of the boundary.

Figure 9:
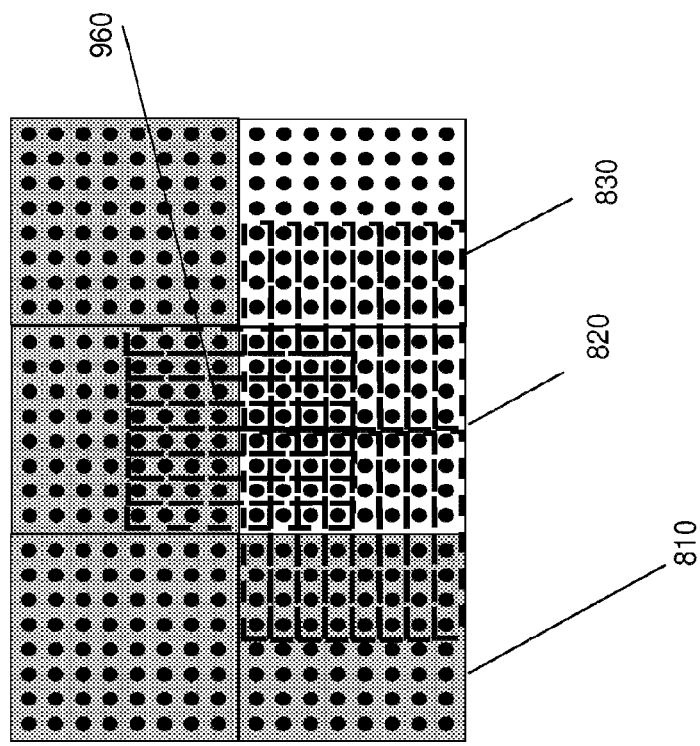
FIG. 9 is a schematic drawing illustrating pixel samples employed for performing a second kind of decisions in the flow chart of FIG. 7.

FIG. 9 provides an overview of all sample pixels of the non-deblocked signal S' used to perform the decisions D2. Since these decisions are performed line-individually, pixels of all lines that are perpendicular to the respective boundary for which the decision is to be taken, are included into samples 960 illustrated in FIG. 9. As explained above, decision D2 requires the first four pixels adjacent to the boundary on both sides to be evaluated. Samples 960 show the samples used to perform the decisions D2 for the same boundaries, for which FIG. 8 illustrates the samples used to perform the decisions D1.

Figure 10:
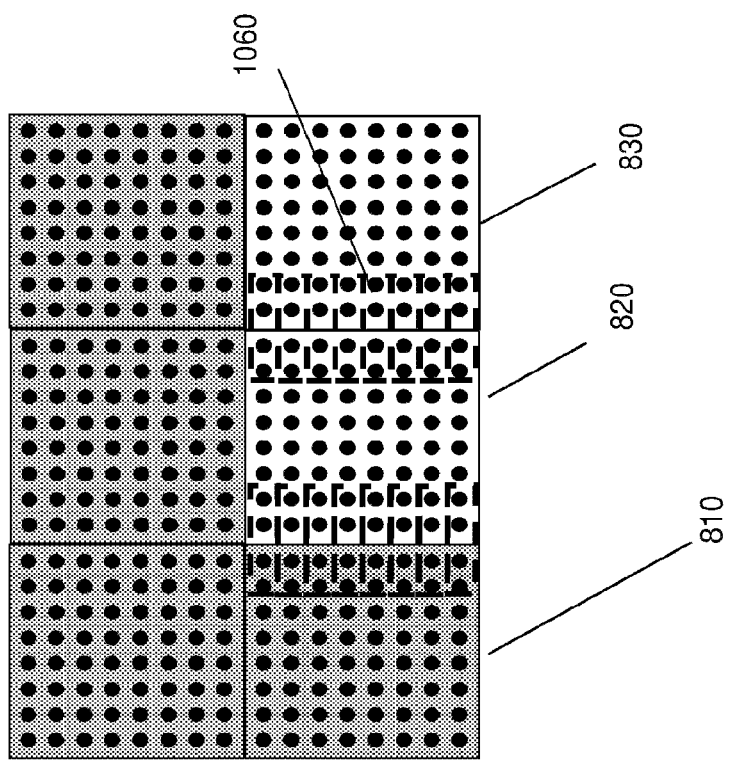
FIG. 10 is a schematic drawing illustrating pixel samples used to perform a third kind of decisions in the flow chart of FIG. 7 for the case of horizontal filtering of vertical edges.

In FIG. 10, samples 1060 are illustrated for being used to perform the decisions D3 for horizontal filtering of vertical edges, i.e. for the boundaries between current block 820 and previous block 810 and next block 830, respectively. As explained above, the decision is performed individually for each line, but only two pixels from each side next to the boundary are employed for the decision.

Figure 11:
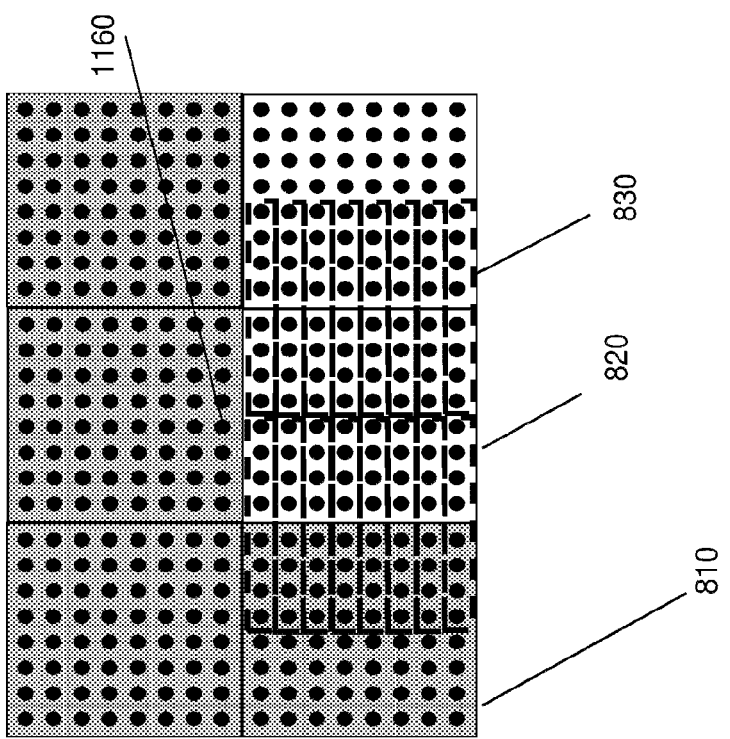
FIG. 11 is a schematic drawing illustrating pixel samples used to perform horizontal deblocking filtering for vertical edges.

FIG. 11 illustrates samples 1160 used to perform the horizontal deblocking filtering for vertical edges. As can be seen therefrom, and contrary to FIG. 10, a "depth" of four pixels on both sides of the boundary is required for the filtering itself.

Figure 12:
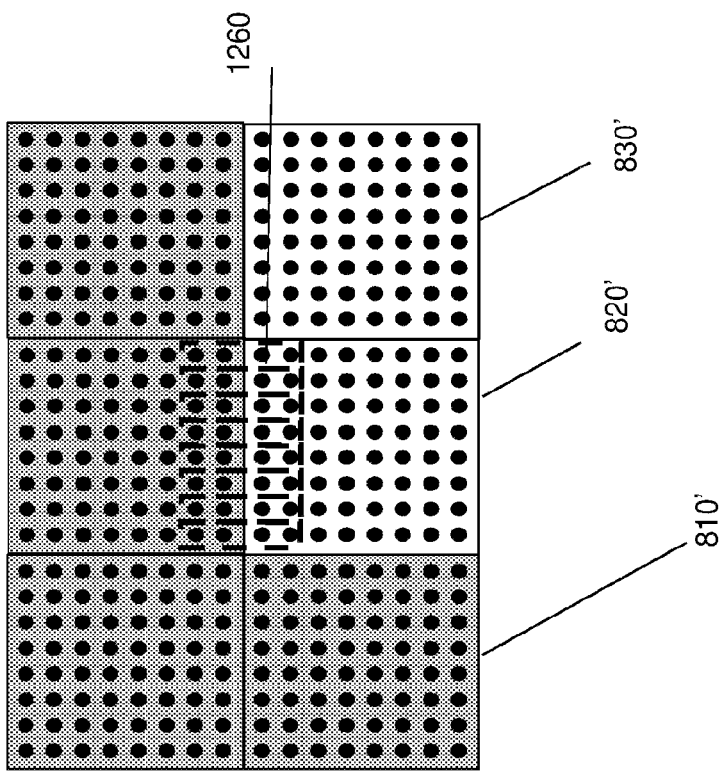
FIG. 12 is a schematic drawing illustrating sample pixels used to perform the third kind of decisions in the flow chart of FIG. 7 for the case of vertical filtering of horizontal edges.

FIG. 12 illustrates the samples 1260 used to perform the decisions D3 for vertical filtering of horizontal boundaries. Since said decision is only to be performed after performing horizontal deblocking of the vertical edges, these samples are selected from horizontally deblocked signal S" of FIG. 3. In order to visualize the difference between the blocks of FIG. 12 and the blocks illustrated in the foregoing figures, an apostrophe has been added to the reference numbers of each of the blocks. Hence, the previous, current and next blocks in FIG. 12 have been denoted as 810', 820' and 830', respectively.

Figure 13:
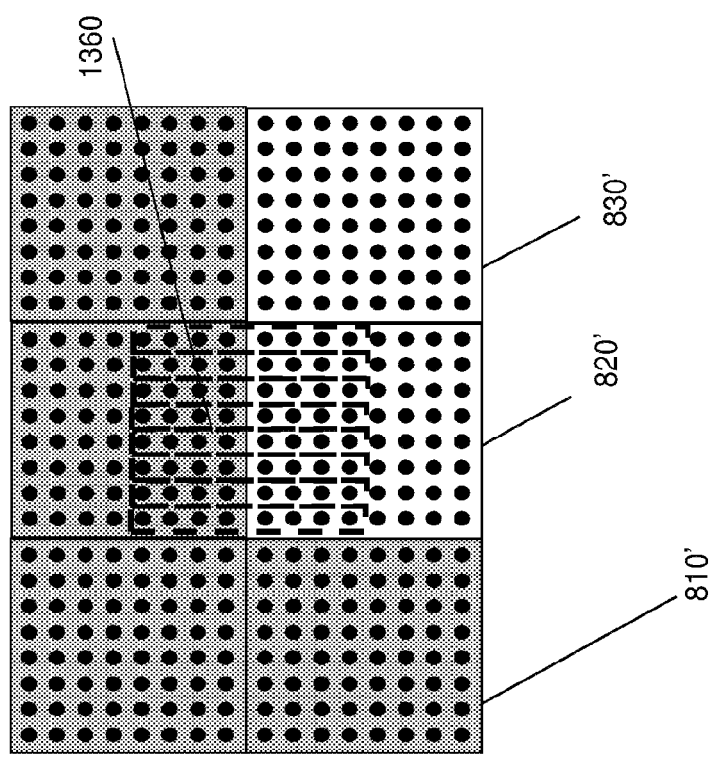
FIG. 13 is a schematic drawing illustrating sample pixels used to perform the vertical deblocking filtering for horizontal edges.

FIG. 13 illustrates samples 1360 used to perform the actual vertical deblocking filtering for horizontal edges. Hence, FIG. 13 differs from FIG. 12 in the same way as FIG. 11 differs from FIG. 10. In particular, four pixels counted from the block boundary are sampled on both sides of the boundary.

Figure 14:
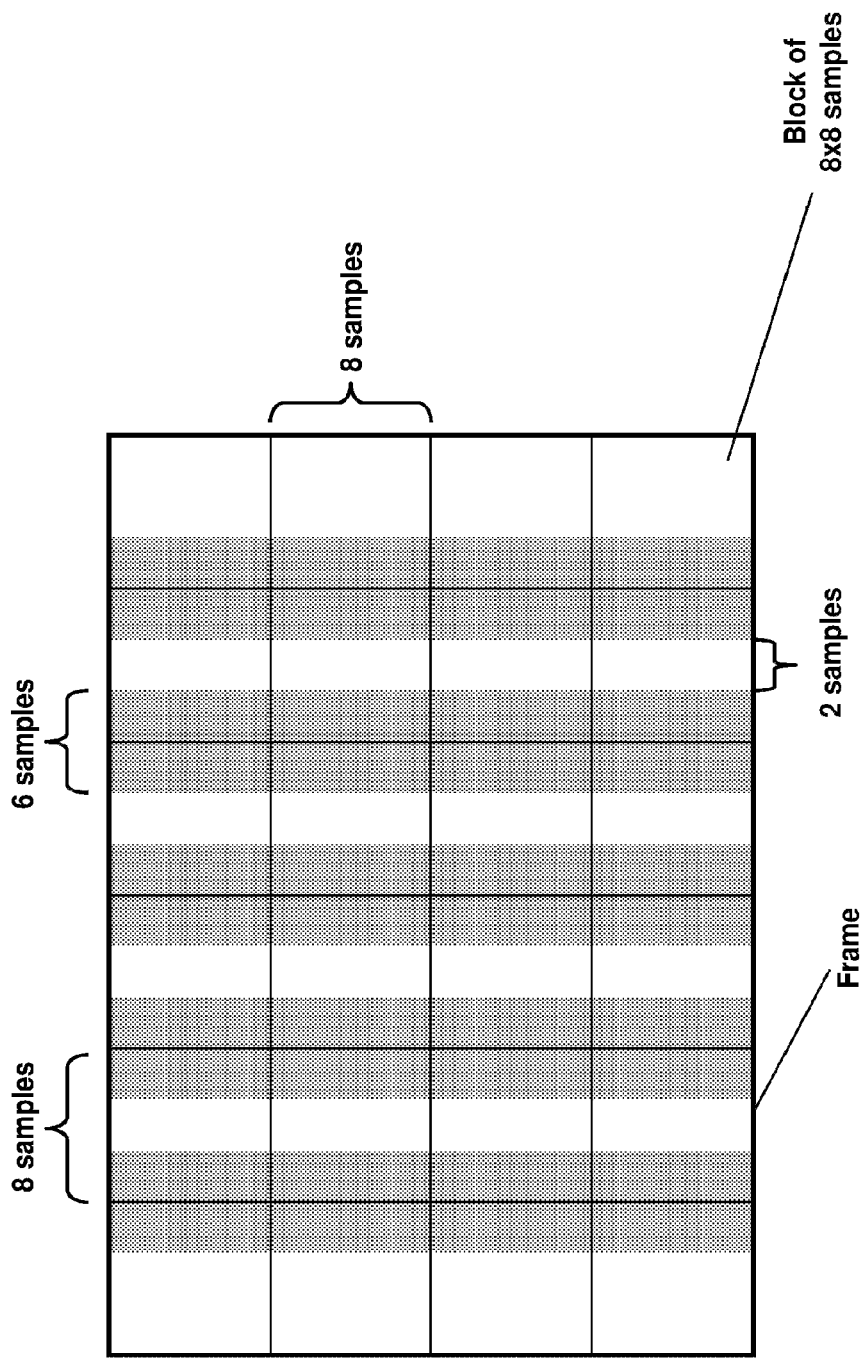
FIG. 14 is an illustration of samples, which may be modified by the horizontal deblocking of vertical edges.
Figure 15:
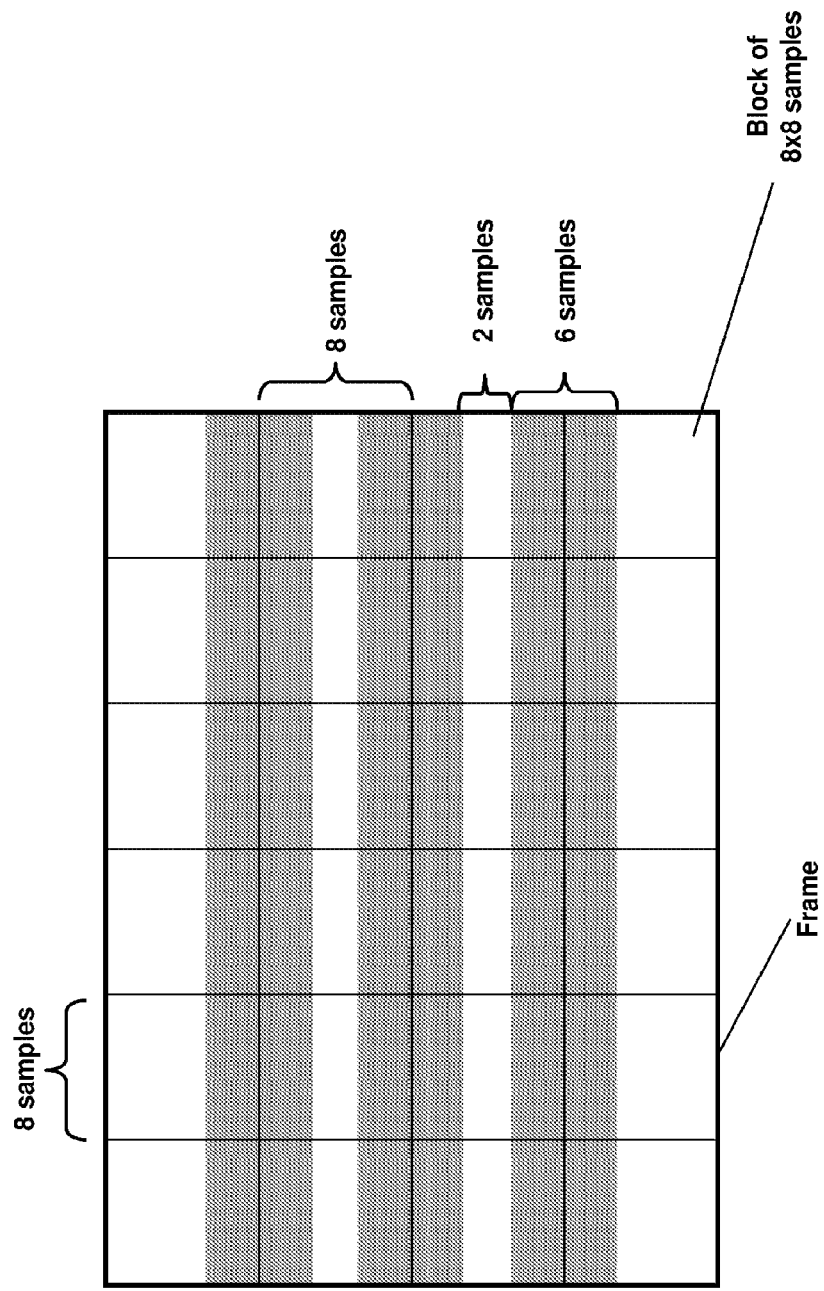
FIG. 15 is an illustration of samples modified by the horizontal deblocking of vertical edges.
Figure 16:
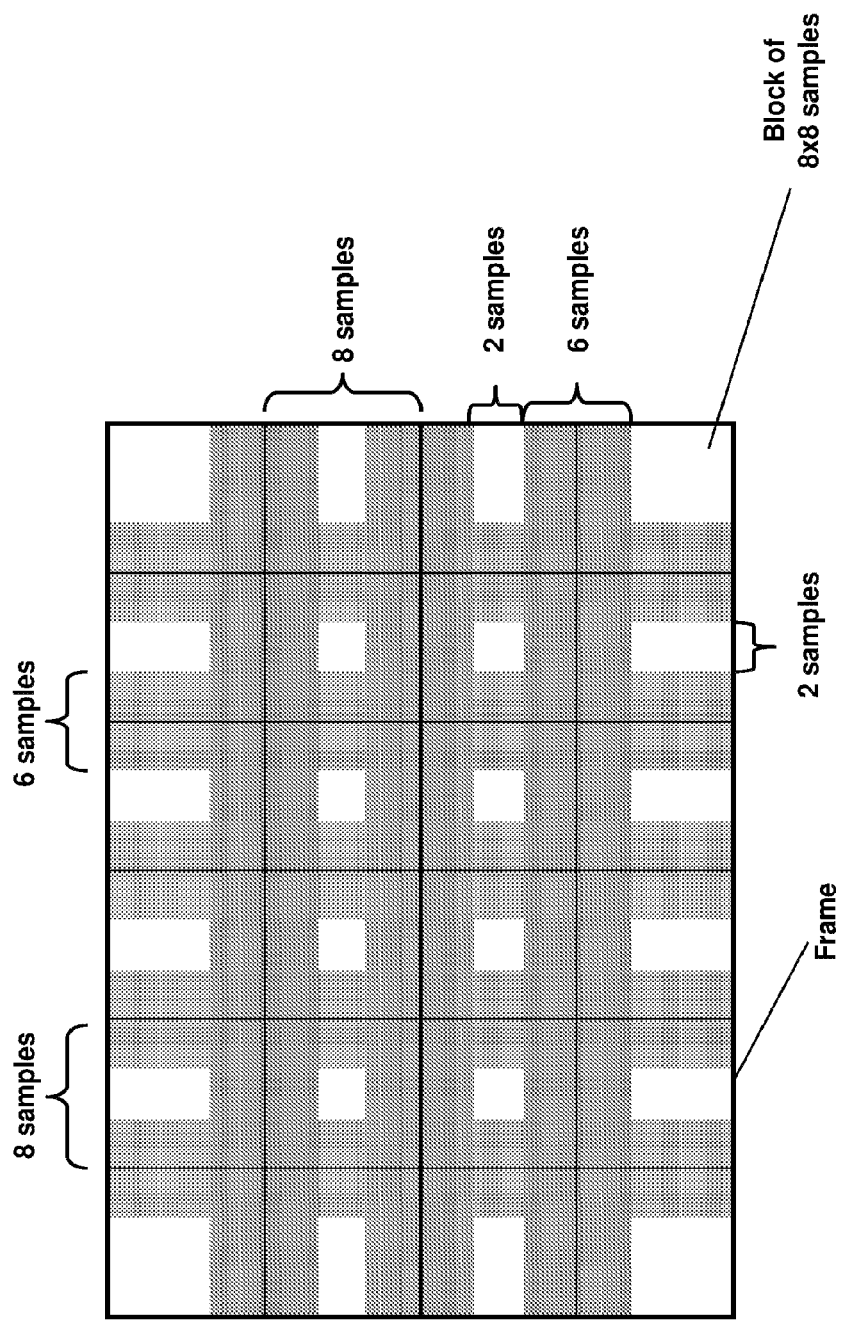
FIG. 16 is a an illustration of samples modified by either the horizontal or vertical deblocking.

The following figures, FIGS. 14 to 16 illustrate the pixel samples which may be modified (contrary to the pixel samples to be used for the decision and for performing the filtering). As in the foregoing examples, a block of 8×8 samples (i.e. eight rows and 8 columns, or eight lines in each direction) is illustrated. However, said block size is an example only.

Specifically, FIG. 14 provides an illustration of samples, which may be modified by the horizontal deblocking of vertical edges. Out of the pixels of eight lines parallel to the boundary to be deblocked for a block (denoted "8 samples" in the drawing), a maximum of three lines on both sides of the boundary becomes modified. As a consequence, a sequence of six samples close to the boundary becomes modified. These samples are shaded in FIG. 14. Consequently, in an overall 8×8 block, two samples in between the blocks to be modified remain unchanged in each block.

FIG. 15 illustrates the samples modified by the horizontal deblocking of vertical edges. Consequently, FIG. 15 basically corresponds to FIG. 14, wherein, however, the shading portions have been rotated by 90°.

FIG. 16 provides an overall illustration of samples modified by either the horizontal or the vertical deblocking. Thus FIG. 16 corresponds to an overlay of FIGS. 14 and 15.

Figure 17A:
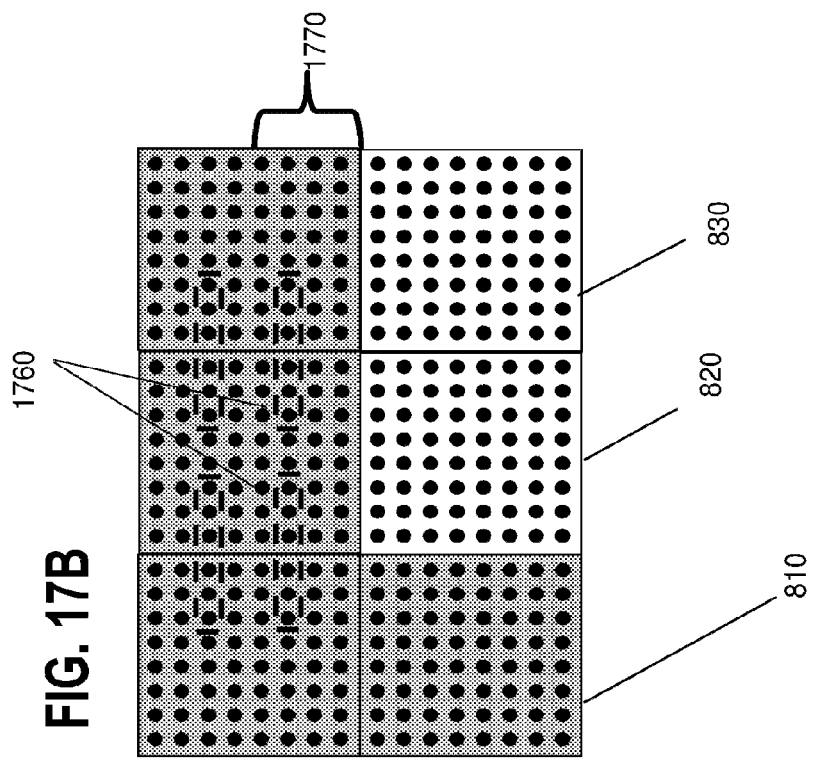
Figure 17B:
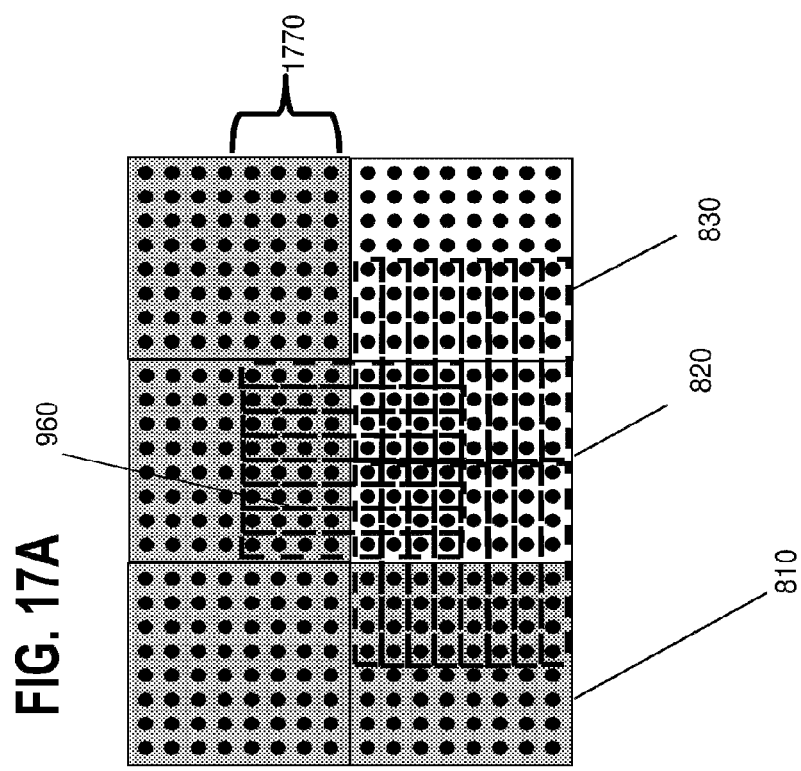

Based on the above explanations, the problem underlying the present disclosure will now be detailed by way of example based on FIGS. 17A and 17B. The overall idea of solving said problem will be illustrated in FIG. 17C.

It is noted that the block size and consequently the numbers of stored lines and lines to be used to perform the decision is given in the following detailed description by way of example only. The present invention is not limited to 8×8 blocks, and consequently the number of sample pictures is not limited to those detailed below. Other block sizes, and consequently a different number of samples to be stored and selected, are possible within the framework of the present disclosure, as defined by the appended claims. Also, the present disclosure is not limited to the example of the horizontal deblocking to be performed first detailed in this specification and illustrated in FIG. 3. An analog application of the invention to the opposite case of performing vertical deblocking before horizontal deblocking is straightforward.

FIG. 17A basically corresponds to FIG. 9. In addition, reference number 1770 indicates a sample of four lines that are required to perform the decision D2 (strong or weak filter) of the vertical boundary between the block above current block 820 and current block 820.

As described above, the decisions D1 and D2 are to be performed on non-deblocked samples. Therefore, these decisions have to be performed as long as non-deblocked signal S' of FIG. 3 is still available, i.e. before the vertical filtering of the horizontal edges in filter 350a actually starts. In other words, filtering (in particular: the horizontal filtering of vertical edges to be performed first in accordance with the flowchart of FIG. 3) is delayed by decisions D1 and D2, in particular, for the vertical filtering of horizontal edges. Consequently, the samples of four lines indicated by the numeral 1770 in FIG. 17A, each of a length corresponding to the picture width of the non-deblocked signal required to perform the decision D2 for vertical filtering are available at the moment of starting the delayed horizontal filtering at vertical boundaries.

A hardware implementation can be accomplished as follows: Non-deblocked samples are stored in a line memory, and the decisions D1 and D2 are subsequently performed for the horizontal filtering of vertical edges and for the vertical filtering of horizontal edges for the current block, using the stored non-deblocked samples. Subsequently, a delayed horizontal filtering of the vertical edges is performed for the region including the four stored lines.

For this delayed horizontal filtering, however, the result of the previously performed corresponding on/off decision D1 is necessary. Consequently, the result of said decision needs to be either stored, or re-calculated. In case said result is not stored, the re-calculation in accordance with the above described conventional scheme requires sample pixels from a line that does not belong to stored lines 1770. Namely, for the re-calculation of the decision result of decision D1, sample pixels 1760 illustrated in FIG. 17B are required (corresponding to samples 430 in FIG. 5, i.e. pixels of the third and sixth line (with subscripts 2 and 5 in FIG. 5). While the sixth line (with subscript 5 in FIG. 5) belongs to the lines which have been stored anyway, this is not the case for the third line (with subscript 2 in FIG. 5).

Hence, either the decision result of the previously taken decision D1 for the delayed horizontal filtering has to be stored or even pixel data from an additional line (the upper line of the lines 1760 in FIG. 17B) has to be additionally stored. However, since line memory is very expensive, the latter alternative would be associated with higher costs.

Still alternatively, the delay of the vertical filtering could be avoided by the use of additional line memory. Namely, if there are two line memories, one of which holds the non-deblocked signal and the other of which holds the horizontally deblocked signal, decisions D1 and D2 for the vertical filtering could be postponed. However, since line memory is very expensive, said alternative is even more disadvantageous.

Therefore, in the above described conventional scheme, the problem arises that either the decision result of decision D1, or an additional line, not included in the stored lines (here: four lines 1770) have to be stored for a delayed filter operation.

The present invention aims at overcoming the drawback of the conventional approach caused by the storing problem described above.

In accordance with the present disclosure, each block (in the present example: a block of eight lines (rows/columns)) is separated in at least two segments. The segmentation is performed in such a way that it is possible to perform all decisions (D1: on/off and D2: strong/weak) for the horizontal filtering of vertical edges on the basis of only the stored lines 1770 (necessary for performing the respective decisions for the vertical filtering of horizontal edges) and independently from other lines. As a consequence, no decision buffer or additional line memory is required any longer for a delayed horizontal filtering of vertical edges.

Said idea is illustrated in FIG. 17C. Namely, by means of segmentation the decision D1 for delayed horizontal filtering of vertical edges shall be modified in such a manner that the decision is taken based only on those samples of the non-deblocked signal S' included in the dash box 1760a of FIG. 17C. As can be easily seen, all those pixels belong to stored lines 1770.

More specifically, the inventive solution is described with reference to FIG. 17D. Namely, throughout the blocks involved in the horizontal filtering, segmentation is performed by dividing the block along the horizontal segmentation line (i.e. a line perpendicular to the boundary to be deblocked). For the sake of simplicity, in FIG. 17D, segmentation is illustrated only for the upper row of blocks. The dashed segmentation line 1700 divides each block into two segments (sides) in a vertical direction. Furthermore, the scheme of taking the decision D1 is modified in such a way that no samples from the respective other side are required for taking decision D1 for horizontal deblocking of vertical edge within the region of one of the segments.

In other words, the decision D1 is no longer taken for the block as a whole, but separately for each segment (side). For taking the decision on side 1, only samples from side 1 (in particular: the samples indicated by number $1760_1$) are used. For taking the decision for the region of the segment of side 2, only samples on side 2 (in particular: those indicated by number $1760_2$) are used.

Vice versa, samples situated on side 1 are not used for the decisions required to perform the horizontal filtering of vertical edges on side 2, and samples on side 2 are not used for the decisions required to perform the horizontal filtering of vertical edges on side 1.

In particular, consequently, the decision for side 2 can be taken on the basis of the stored lines 1770, without reference to any non-stored lines. Thus neither storing a previously determined result nor storing an additional line in an expensive line memory is required.

Concerning side 1, a separate decision can be taken at the time when the respective lines are still stored from the vertical deblocking decision with respect to the boundary between the other row of blocks in FIG. 17 and the next blocks above (not shown in FIG. 17).

An important advantage of the decision scheme in accordance with the present disclosure is the limitation of the dependencies in the deblocking to areas having the size of a block. As a consequence, if the sample areas (blocks) for deciding are appropriately chosen, they can be deblocked in parallel to each other. It has to be noted that the sample areas (blocks) for deciding are generally different from the blocks to the boundaries of which deblocking is applied. Said advantageous technical effect is illustrated in FIG. 18 (for the example of 8×8 blocks).

Figure 18:
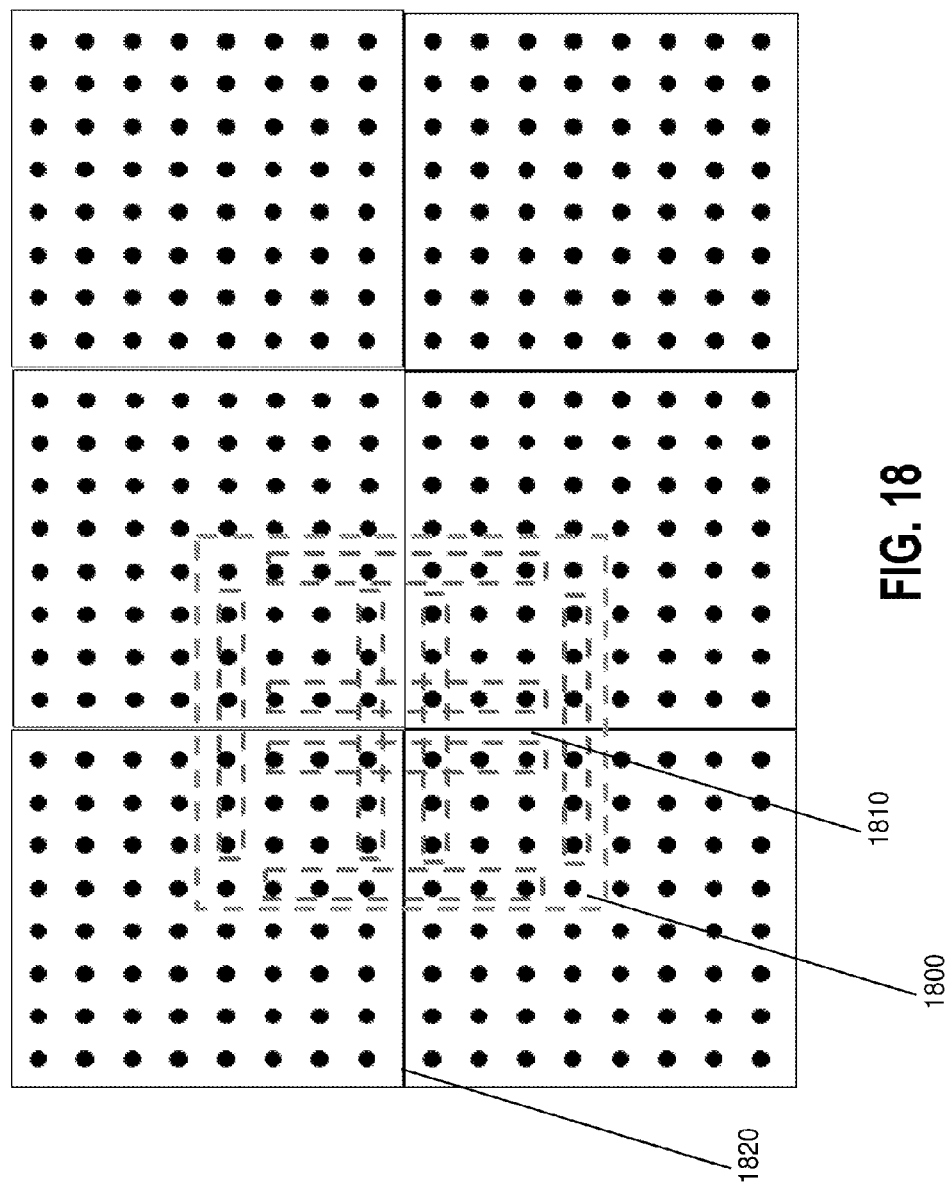
FIG. 18 is a scheme illustrating that the dependencies in the deblocking according to the present disclosure are limited to 8×8 samples.

FIG. 18 is generally based on FIG. 17D and shows six 8×8 blocks the block boundaries of which are to be deblocked. Further in FIG. 18, an 8×8 area 1800 has been emphasized by a dashed square. Within said area 1800, the samples necessary for deciding for the horizontal deblocking of the vertical edge 1810 are illustrated (in the same manner as, for instance, samples $1760_2$ in FIG. 17D by small dashed rectangles). In addition, the respective samples for vertical deblocking filtering of horizontal edge 1820 within area 1800 are highlighted (small dashed rectangles with vertical orientation).

As can be seen from FIG. 18, all decisions can be made for the 8×8 block 1800 without the need to refer to any samples outside said area. Hence, 8×8 area (block) 1800 (and the respective blocks shifted by multiples of 8 pixels in horizontal and/or vertical direction) are appropriate deciding blocks for which can be processed by the deblocking filtering in parallel.

Such an advantage cannot be achieved in the conventional deciding and filtering scheme. As can be seen, for instance, from FIG. 8, in the previous scheme there is no 8×8 area (block) for which the samples for deblocking decision are limited to said same area, such that deblocking filtering decisions can be made independently within said area. Thus, parallelization is prevented by the conventional scheme.

A still more particular explanation of an exemplary solution for performing decision D1 (deblocking filter on/off) from an eight line block segmented into two four line segments will be described below with reference to FIG. 19. FIG. 19A illustrates the on/off decision for the four line segment on side 1. As can be seen from FIG. 19A, the decision is taken based on the first line (with subscript 0) and the fourth line (with subscript 3) only. More specifically, the following parameters are calculated:

$$d_{p0}=|p2_0-2 \cdot p1_0+p0_0|$$

$$d_{p3}=|p2_3-2 \cdot p1_3+p0_3|$$

$$d_{p,side1}=d_{p0}+d_{p3}$$

and $$d_{q0}=|q2_0-2 \cdot q1_0+q0_0|$$

$$d_{p3}=|q2_3-2 \cdot q1_3+q0_3|$$

$$d_{p,side1}=d_{q0}+d_{q3}.$$

The filter is enabled if the following condition is fulfilled:

$$d_{q,side1}+d_{p,side1}<\beta.$$

Figures 19A, 19B:
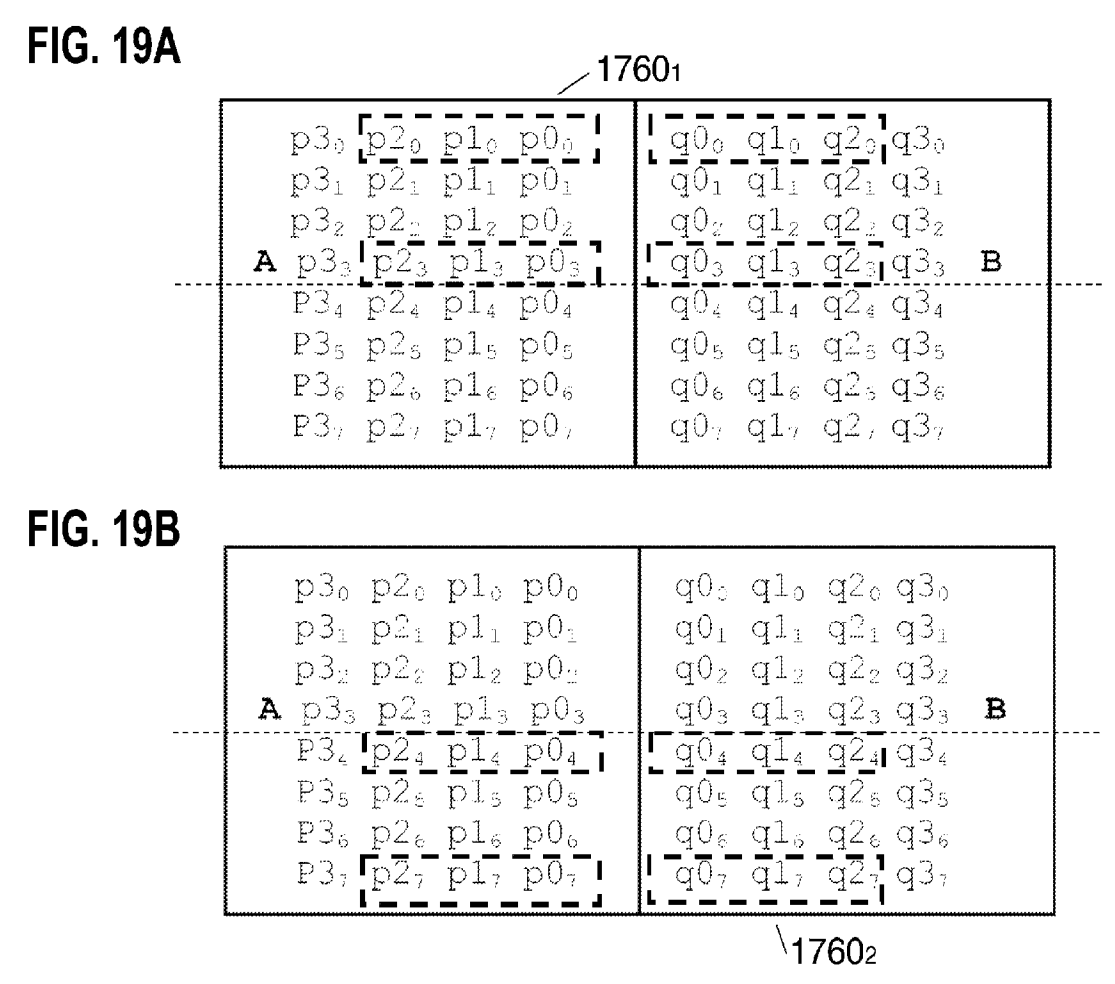

FIG. 19B illustrates the respective decision taking for side 2, based on samples $1760_2$. The respective calculations are:

$$d_{p4}=|p2_4-2 \cdot p1_4+p0_4|$$

$$d_{p7}=|p2_7-2 \cdot p1_7+p0_7|$$

$$d_{p,side2}=d_{p4}+d_{p7}$$

and $$d_{q4}=|q2_4-2 \cdot q1_4+q0_4|$$

$$d_{q7}=|q2_7-2 \cdot q1_7+q0_7|$$

$$d_{q,side2}=d_{q4}+d_{q7}$$

The filter is enabled if the condition is fulfilled:

$$d_{p,side2} = d_{p,side2} < \beta.$$

As can be seen from the above details, the modification of decision D1, based on block segmentation, results in a slight increase in the overall computational expense. Namely, instead of a conventional single on/off decision for a block of eight lines, requiring 20 operations, the on/off decision has to be taken twice, for 4 lines, requiring 40 operations. Hence, the number of operations required for taking decision D1 alone has doubled.

It is therefore preferable to further modify within the present disclosure also the implementation of decision D2, i.e. the decision on whether a strong or weak filter is appropriate to be applied, to compensate for the increased computation expense.

FIG. 20 illustrates a first specific solution for a modified decision D2, based on the segmentation in accordance with the present disclosure. As described above, in the conventional example, decision D2 is taken for each line individually. In contrast, in accordance with the present disclosure, an individual decision is taken only for a subset of lines per segment. On the basis of the individual decisions for the subset of segments, a single decision of a filter is taken for all lines of the segment.

Figures 20A, 20B:
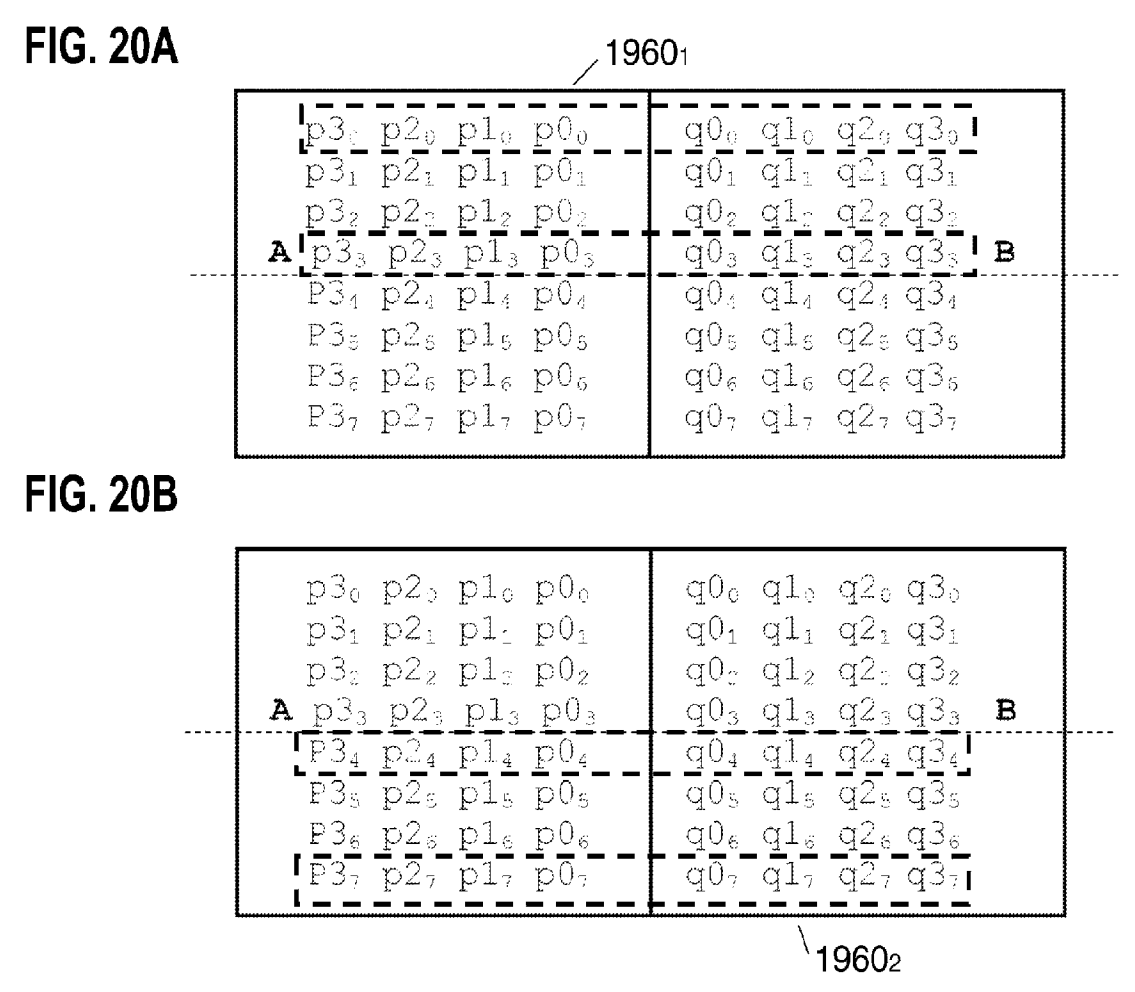

More specifically, FIG. 20A shows the modified decision D2 in accordance with the first specific example for side 1. The decision is based on the first line (having subscript 0) and the fourth line (having subscript 3), which are indicated by the number $1960_1$ in FIG. 20A. For each of the two lines with the subscripts 0 and 3, the decision between strong and weak filter is performed (preferably in the conventional manner described above). If for both lines the strong filter is selected, all four lines (0, 1, 2, 3) are strongly filtered. Otherwise, the weak filter is selected.

The respective operation scheme on side 2 is illustrated in FIG. 20B. Decision D2 for side 2 is based on the two lines with subscripts 4 and 7, indicated with reference numeral $1960_2$. For each of the two lines 4 and 7, the decision between a strong and a weak filter is performed. If for both lines the strong filter is selected, all four lines 4, 5, 6, 7 are strongly filtered. Otherwise, the weak filter is selected.

A simulation reveals that the coding efficiency according to the described embodiment of the present disclosure is slightly increased with respect to the conventional HM 4.0 scheme described above. The coding efficiency of the embodiment of the invention described above with reference to FIGS. 19 and 20 has been evaluated based on the coding conditions commonly used in the standardization activities of the ISO and the ITU, see document JCTVC-E700 (http://phenix.int-evry.fr/jct/doc_end_user/current_document.php?id=2454). The invention leads to an average bit rate reduction of around 0.15% at the same mean squared quantization error.

Further, on the basis of the modification of both decisions D1 and D2, a decrease in the overall computational expense can also be achieved. Namely, in accordance with the above described conventional scheme, the following overall number of operations is required:
on/off decision for 8 lines: 20 operations
8 strong/weak decisions: 96 operations
sum of computations: 116 operations According to the illustrated embodiment of the present disclosure, the overall number of operations is as follows:
2 times on/off decision for 4 lines: 40 operations
4 strong/weak decisions: 48 operations
sum of computations: 96 operations Consequently, the present disclosure enables decreasing the overall number of computations by approximately 20%.

The second exemplary solution of modified decision D2 is similar to the first example described above. In the same manner as in the first example, on the first side for each of the two lines 0 and 3 the decision between a strong and a weak filter is performed. If the weak filter is selected for both lines, all four lines 0, 1, 2, 3 are weakly filtered. Otherwise, the strong filter is selected.

In the same manner, on side 2, for each of the two lines 4 and 7, the decision between a strong and a weak filter is performed. If the weak filter is selected for both lines, all four lines 4, 5, 6, 7 are weakly filtered. Otherwise, the strong filter is selected.

Hence, the second illustrated example differs from the first example in that in accordance with the second example in case of a discrepancy between the individual decisions for the two selected lines, the strong filter is selected, while according to the first example in case of a discrepancy always the weak filter is selected. Since the computational complexity of the weak filter is generally less than for the strong filter, the first example enables a further decrease in computational expense.

In accordance with a third example, modified decision D2 is also performed on the basis of the selected lines illustrated in FIGS. 20A and 20B. However, in accordance with the third example, decision D2 is combined with decision D3. Namely, for each of the selected lines, the combined decision between a strong filter, a weak filter and no filter is performed. The respective decisions are taken on the basis of a look-up table.

More specifically, on side 1, for each of the two lines 0 and 3, the decision between a strong filter, a weak filter and no filter is performed. The two decision results are used to decide for all four lines 0, 1, 2, 3 by means of the following look-up table.

| Decision for line 0 | Decision for line 3 | Resulting decision for lines 0-3 (example) |
|---|---|---|
| Strong | Strong | Strong |
| Strong | Weak | Weak |
| Strong | Off | Off |
| Weak | Strong | Weak |
| Weak | Weak | Weak |
| Weak | Off | Off |
| Off | Strong | Off |
| Off | Weak | Off |
| Off | Off | Off |

On side 2, for each of the two lines 4 and 7, the decision between a strong filter, a weak filter and no filter is performed. The two decision results are used to decide for all four lines 4, 5, 6, 7 by means of the following look-up table.

| Decision for line 4 | Decision for line 7 | Resulting decision for lines 4-7 (example) |
|---|---|---|
| Strong | Strong | Strong |
| Strong | Weak | Weak |
| Strong | Off | Off |
| Weak | Strong | Weak |
| Weak | Weak | Weak |
| Weak | Off | Off |
| Off | Strong | Off |
| Off | Weak | Off |
| Off | Off | Off |

As can be seen from the above tables, in case the decisions for the two lines differ, the one of lower complexity is always selected. Thereby, computational expense is further saved.

A fourth example, illustrated with reference to FIG. 21, is generally similar to the third example. As can be seen from FIG. 21 on side 1 (FIG. 21A the second and third lines with $_1$ and $_2$) are selected for the individual decision. On side 2, the sixth and seventh lines (with $_5$ and $_6$) are selected. Corresponding look-up tables are shown below:

| Decision for line 1 | Decision for line 2 | Resulting decision for lines 0-3 (example) |
|---|---|---|
| Strong | Strong | Strong |
| Strong | Weak | Weak |
| Strong | Off | Off |
| Weak | Strong | Weak |
| Weak | Weak | Weak |
| Weak | Off | Off |
| Off | Strong | Off |
| Off | Weak | Off |
| Off | Off | Off | and

| Decision for line 5 | Decision for line 6 | Resulting decision for lines 4-7 (example) |
|---|---|---|
| Strong | Strong | Strong |
| Strong | Weak | Weak |
| Strong | Off | Off |
| Weak | Strong | Weak |
| Weak | Weak | Weak |
| Weak | Off | Off |
| Off | Strong | Off |
| Off | Weak | Off |
| Off | Off | Off |

It has to be understood that the particular solution of a modified decision D2, performed on a segment basis rather than on an individual line basis, is not limited to the four examples given above. Further modifications as well as combinations of individual elements of these examples are possible within the scope of the present disclosure as defined by the appended claims. In the above examples, a decision D2 has been based on samples of two lines. The present invention is however not limited to said number of lines used for selection. The filter selection may be based on only a single line or any other number of lines that is smaller than the overall number of lines in the respective pair of segments to be deblocked.

Figure 22B:
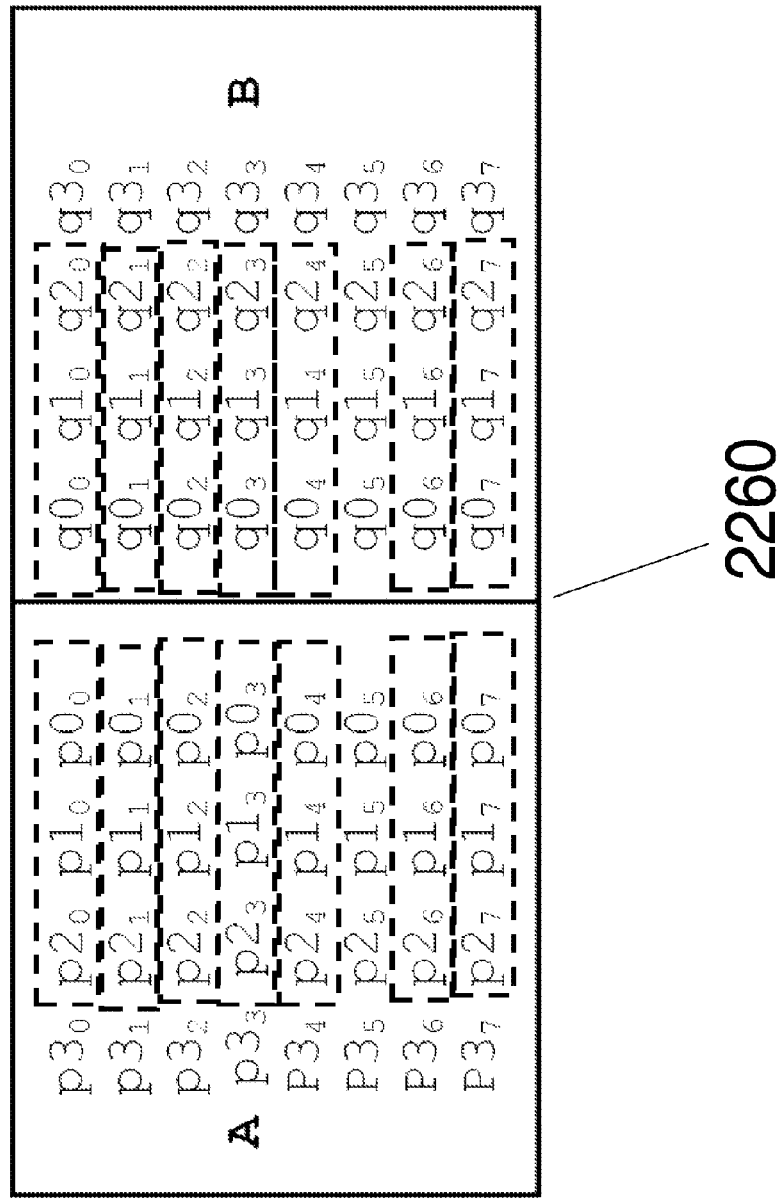

In the following, a first memory access problem occurring in taking the on/off decision D1 is described and addressed with respect to FIGS. 22 and 23. FIG. 22 illustrates the conventional HEVC approach of taking decision D1 for horizontal deblocking of a vertical edge.

As indicated in the upper scheme of FIG. 22A, in a first step line 2 is read in the associated decision values $d_{p2}$ and $d_{p2}$ are calculated. In a second step, line 5 is read and the associated decision values $d_{p5}$ and $d_{p5}$ are calculated.

In a third step, the decision value $d_5=d_{q2}+d_{p2}+d_{q5}+d_{p5}$ is calculated, and the on/off decision D1 is performed for all eight lines. The strong/weak filter decision is then performed for line 5, deblocking and writing back of the deblocking result are performed for line 5.

In a subsequent fourth step, for each of the remaining lines, 0, 1, 2, 3, 4, 6 and 7 the respective line is read, strong/weak filtering is decided, deblocking is performed and the result is written back. As a consequence, the following problem occurs: for deblocking of eight lines, either line 2 or line 5 needs to be read twice: once for the decision D1 and once for the deblocking. In total, 9 line reading operations need to be performed, although there are only 8 lines per block.

Said problem can be advantageously resolved with a modified deblocking scheme as illustrated with reference to FIG. 23. In a first step, line 2 (2362) is read and the associated decision values $d_{b2}$ and $d_{u2}$ are calculated. A modified decision value $d_2=2\times(d_{d2}'+d_{p2})$ is calculated, and the on/off decision D1 valid for this line is based on the criterion $d_2<\beta$. Subsequently, the strong/weak filter decision D2 is performed, it is deblocked and the result is written back. In a second step, line 5 (2365) is read in the same manner, and the associated decision values $d_{b5}$ and $d_{q5}$ are computed. The modified decision value $d_5=2\times(d_{q5}+d_{b5})$ is computed, and the on/off decision D1 is performed based on the criterion $d_5<\beta$ valid for this line. Strong/weak filter decision D2 is performed, and deblocking and writing back the result is individually performed for line 5 (2365).

Figure 23B:
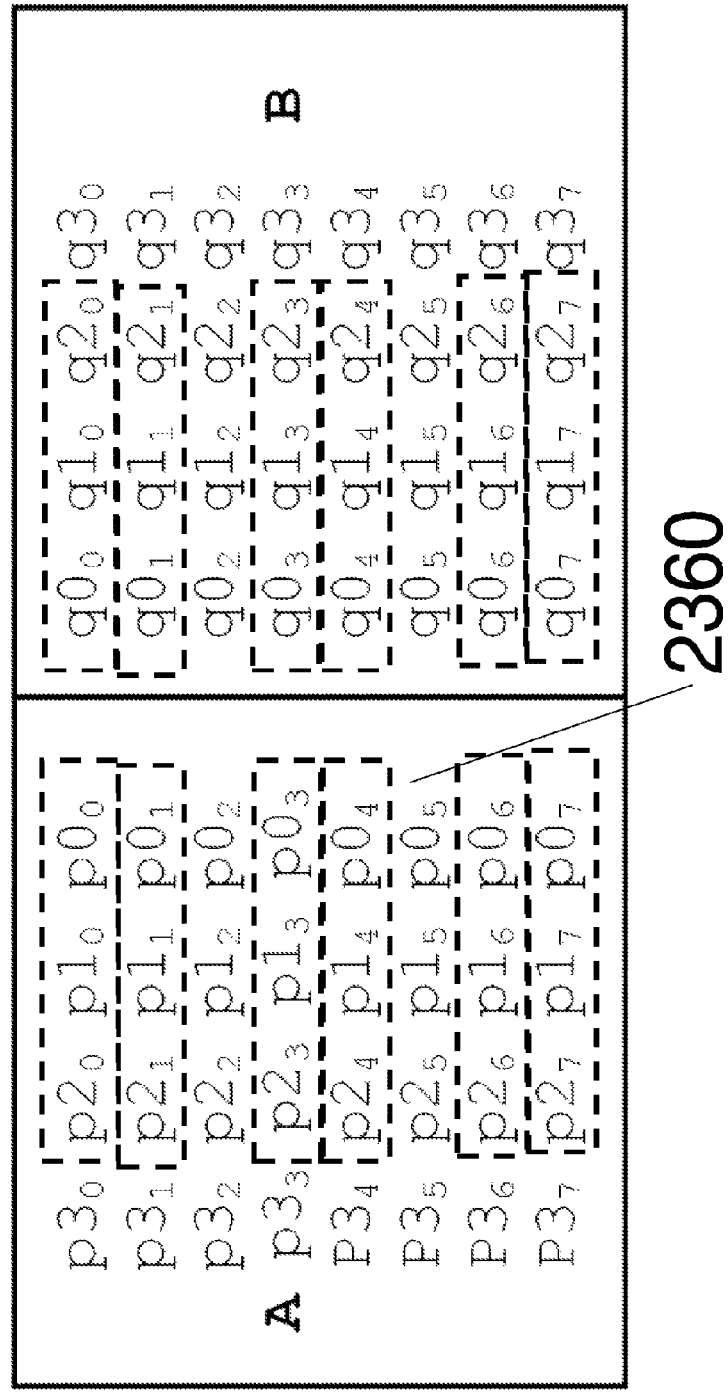

Subsequently, decision value $d=(d_2+d_5)/2$ is computed, and the enable/disable decision $d<\beta$ is performed for remaining lines 0, 1, 3, 4, 6 and 7 as illustrated by reference 2360 in FIG. 23B. In the subsequent fourth step, for the remaining lines 0, 1, 3, 4, 6 and 7 the pixel samples are read, strong/weak filter decision is performed, the deblocking is then carried out and the result is written back.

In accordance with a modified example of the improved deblocking for solving the memory access problem, steps 1, 2 and 4 are performed as previously described. Step 3 described above is modified in that no common decision value d for the remaining lines is computed. To the contrary, the on/off decision in step 3 for the remaining lines 0, 1, 3, 4, 6, 7 is performed on the basis of the decision $(d_2<\beta)\&(d_5<\beta)$.

More generally speaking, a modified decision scheme for decision D1 is performed in such a way that decision D1 is not taken for the whole block, but separately (individually) for those lines, the pixel samples of which are used for calculating and applying the decision criterion (in the present example: lines 2 and 5). Subsequently, the decision is taken for the remaining lines.

The decision scheme for each of the lines for which the decision D1 is taken individually has moreover to be modified in such a manner that the used pixel samples are separated, i.e. the individual decision D1 for a particular line is taken only based on sample pixels from said line. The decision scheme for the remaining lines of the block may either be the conventional one such as described above with reference to FIGS. 4 and 5, or may be also modified. The decision for the remaining lines may be based on pixel samples of all those lines for which an individual decision is taken. The following advantages are achieved by both versions of the modified decision D1: Firstly, each line needs to be read only once, and as a consequence only a number of line reading operations equal to the number of lined per block (in the present case: 8) is to be performed. Moreover, a more accurate decision is achieved for those lines for which the decision is performed individually (in the present case: lines 2 and 5).

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Embodiment 2

Figure 24:
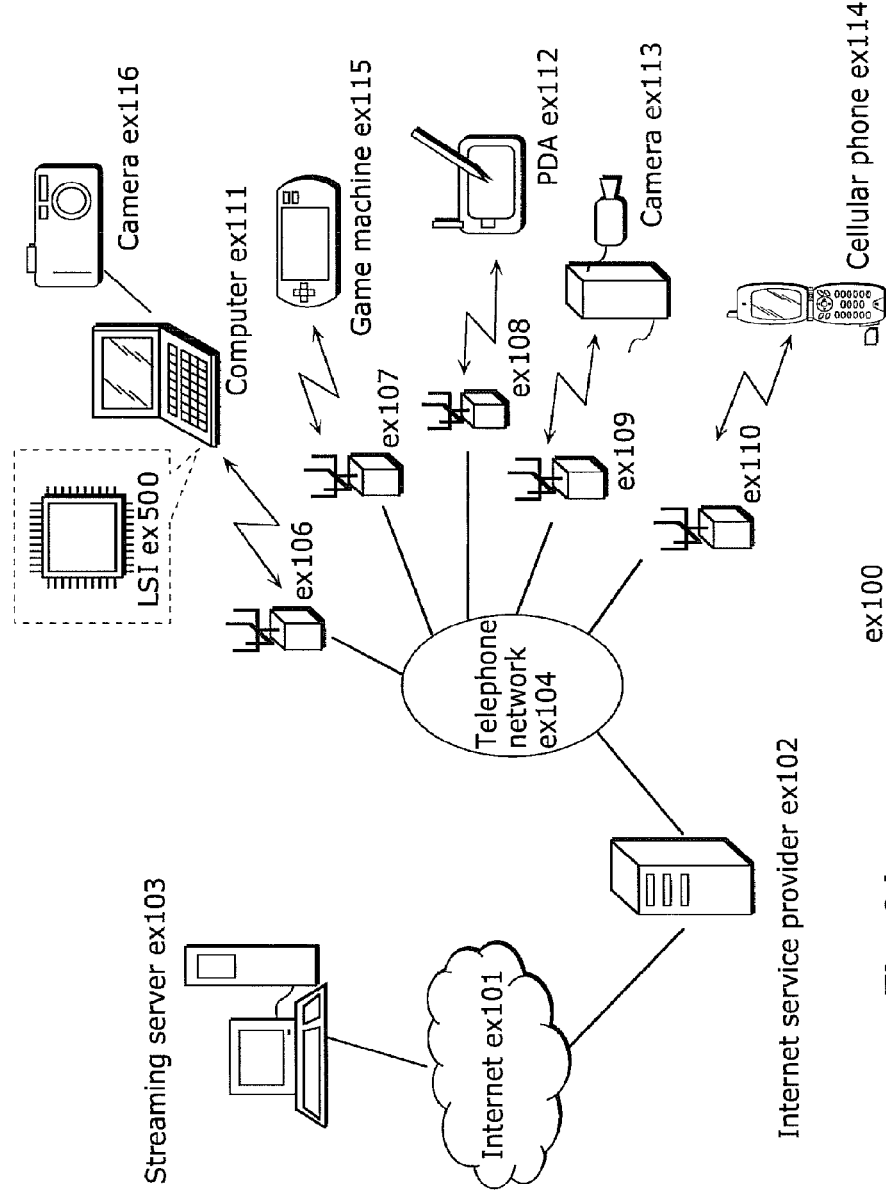
FIG. 24 shows an overall configuration of a content providing system for implementing content distribution services.

FIG. 24 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 24, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 25:
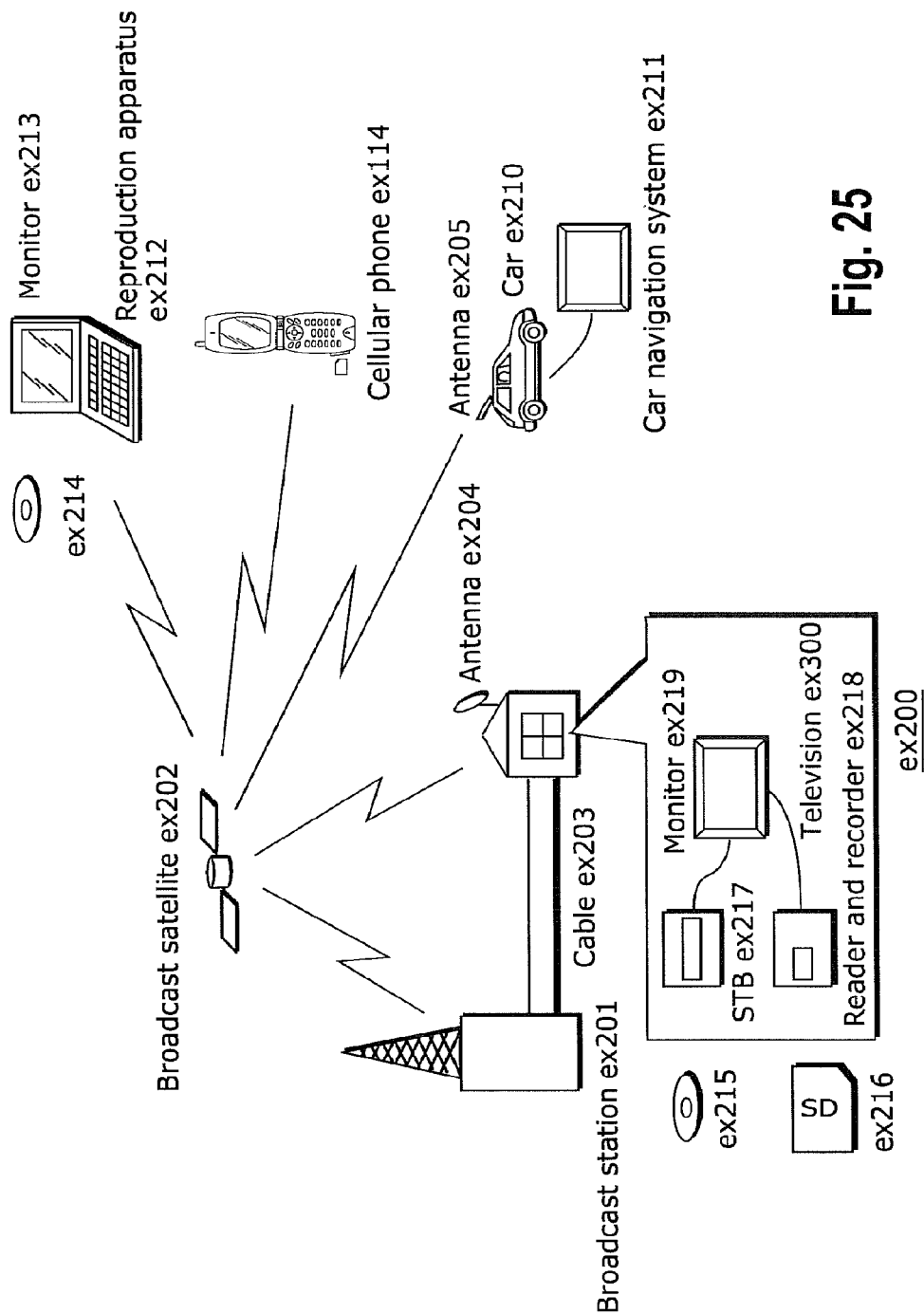
FIG. 25 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 25. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Figure 26:
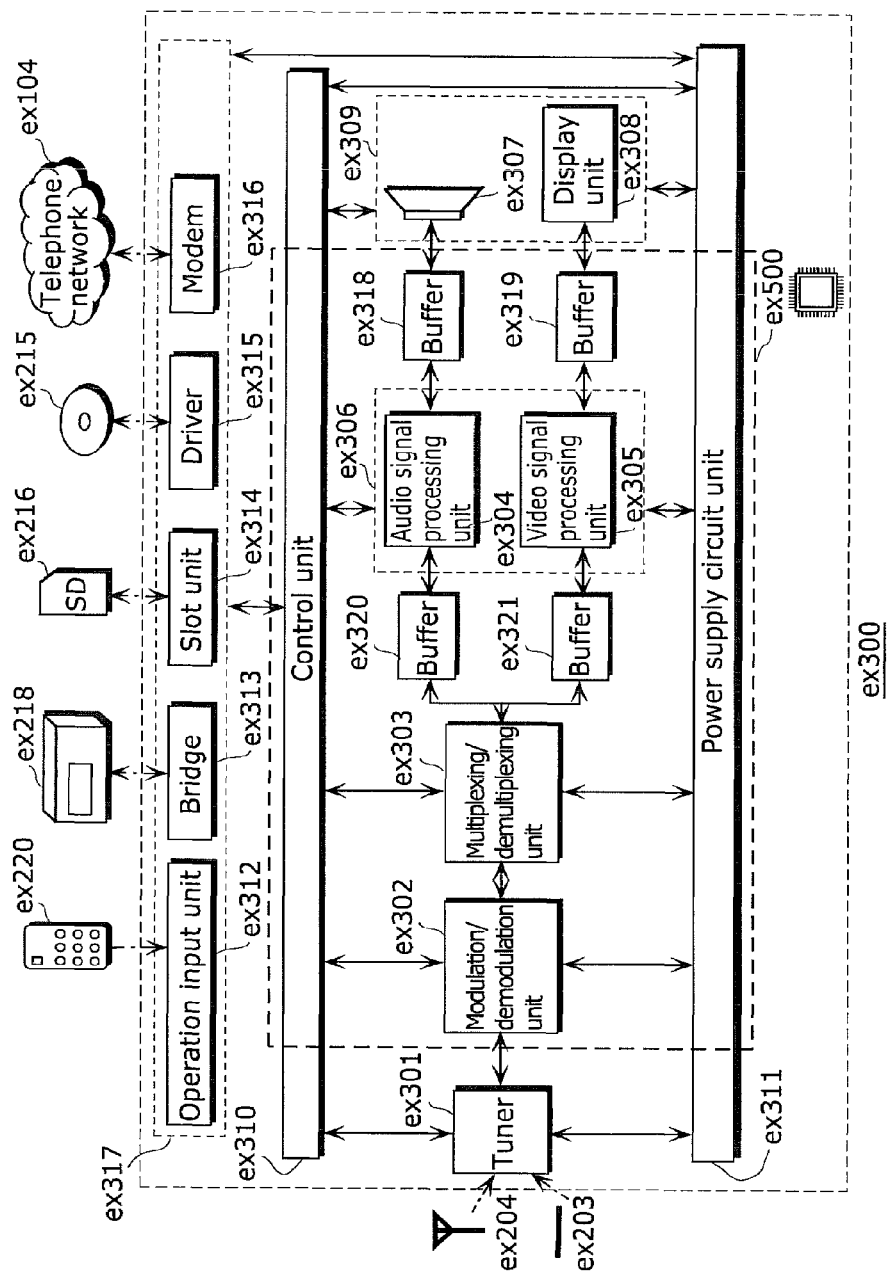
FIG. 26 shows a block diagram illustrating an example of a configuration of a television.

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300. FIG. 26 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 27:
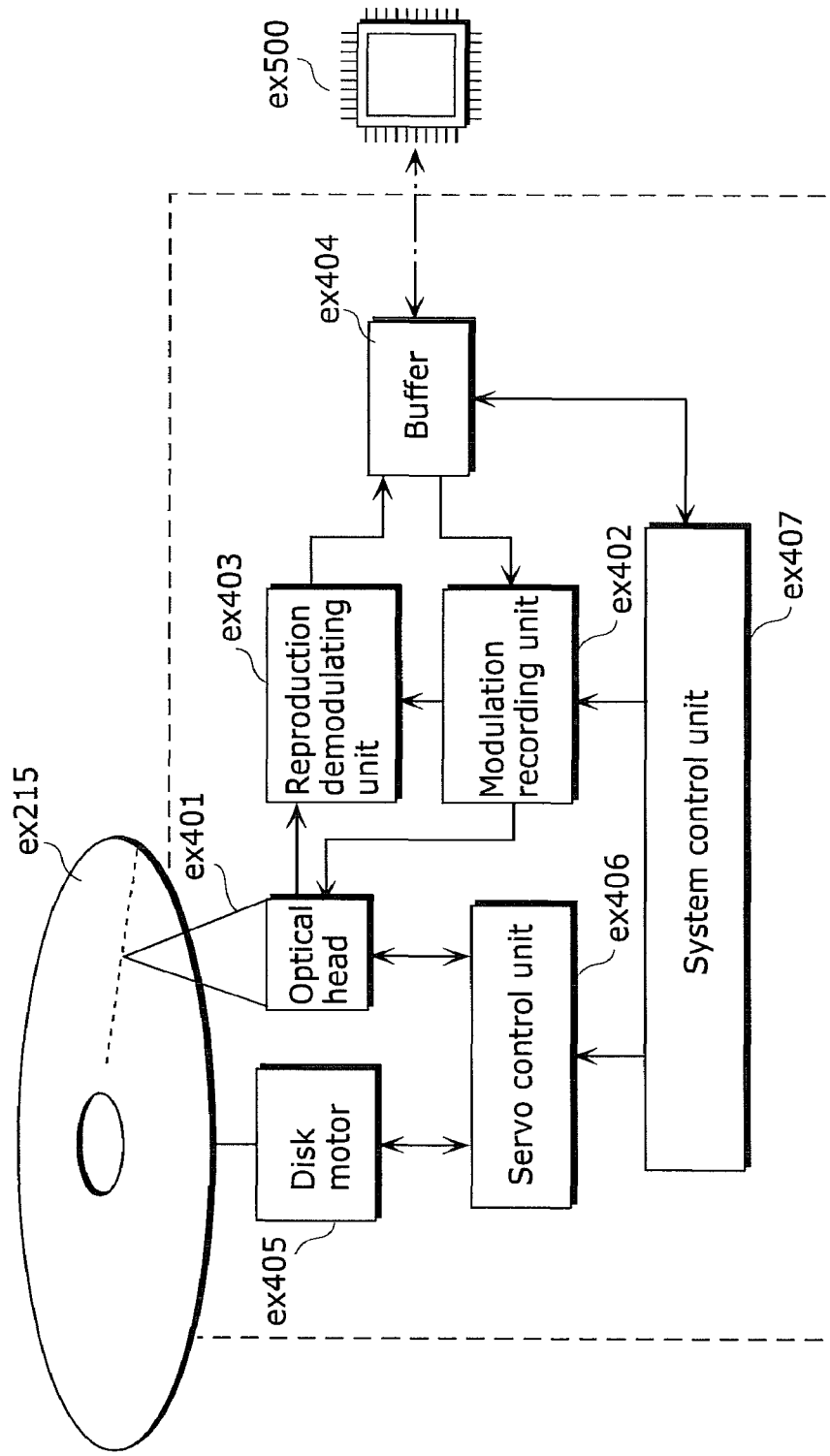
FIG. 27 shows a block diagram illustrating an example of a configuration of an information reproducing/recording unit that reads and writes information from and on a recording medium that is an optical disk.

As an example, FIG. 27 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Figure 28:
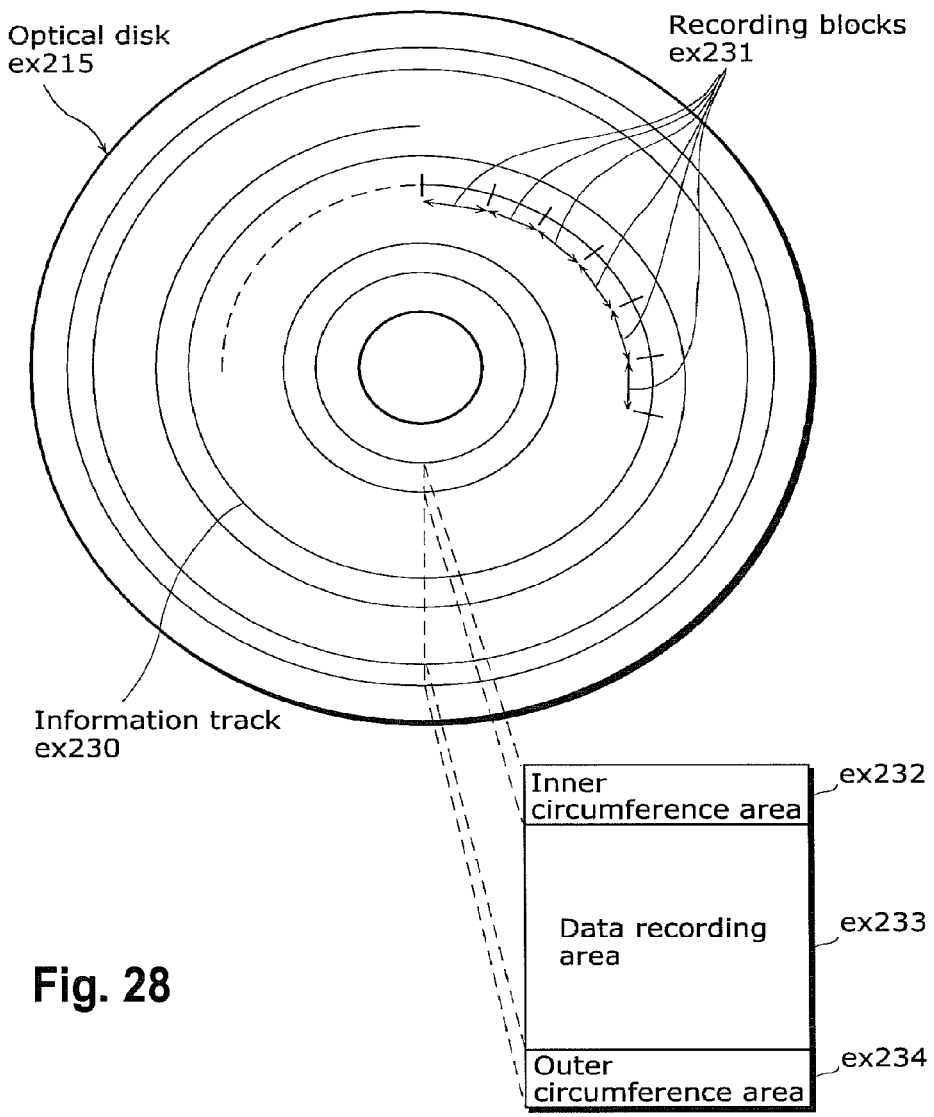
FIG. 28 shows an example of a configuration of a recording medium that is an optical disk.

Although the optical head ex401 irradiates a laser spot in the description, it may perform high-density recording using near field light. FIG. 28 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 26. The same will be true for the configuration of the computer ex111, the cellular phone ex114, and others.

Figure 29A:
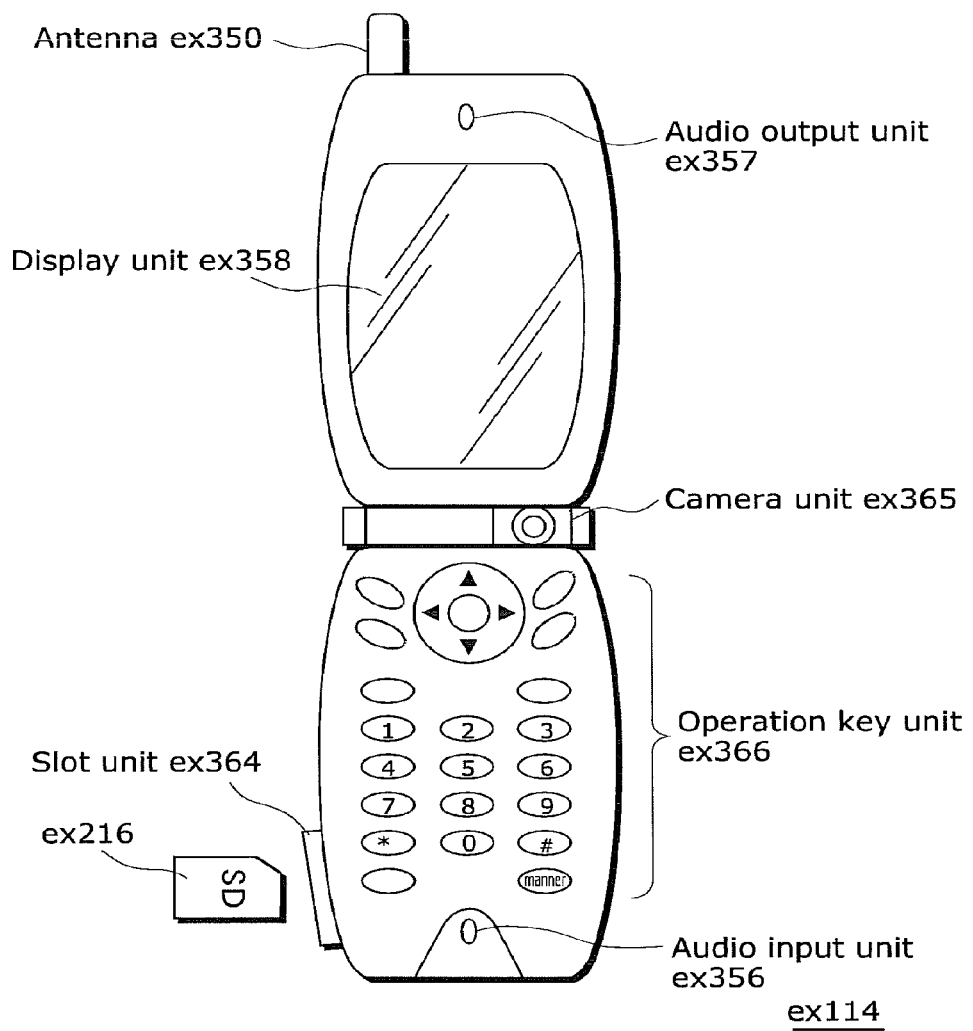
FIG. 29A shows an example of a cellular phone.

FIG. 29A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 29B:
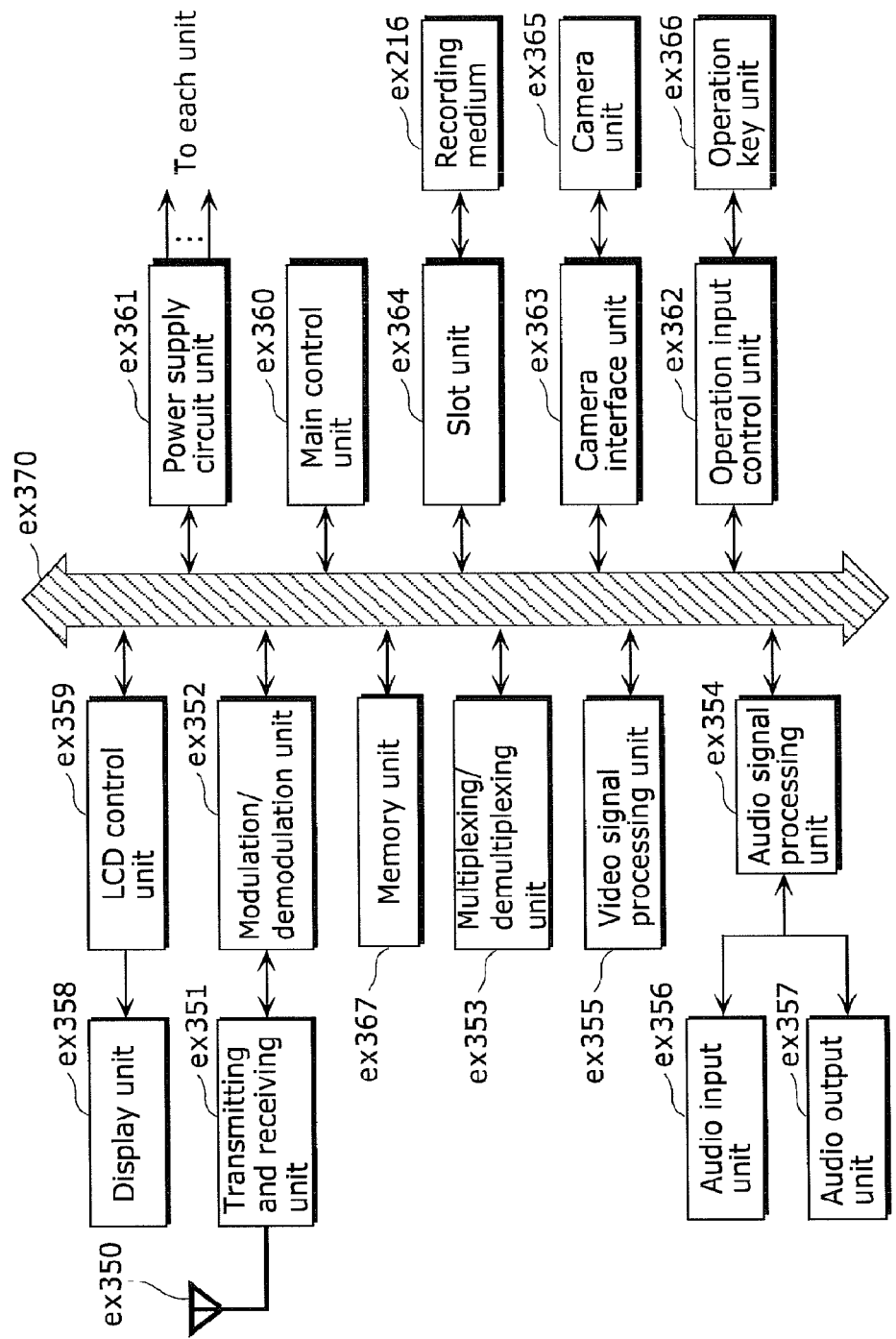
FIG. 29B is a block diagram showing an example of a configuration of a cellular phone.

Next, an example of a configuration of the cellular phone ex114 will be described with reference to FIG. 29B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present disclosure is not limited to embodiments, and various modifications and revisions are possible without departing from the scope of the present disclosure.

Embodiment 3

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards.

However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 30 illustrates a structure of the multiplexed data. As illustrated in FIG. 30, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 31:
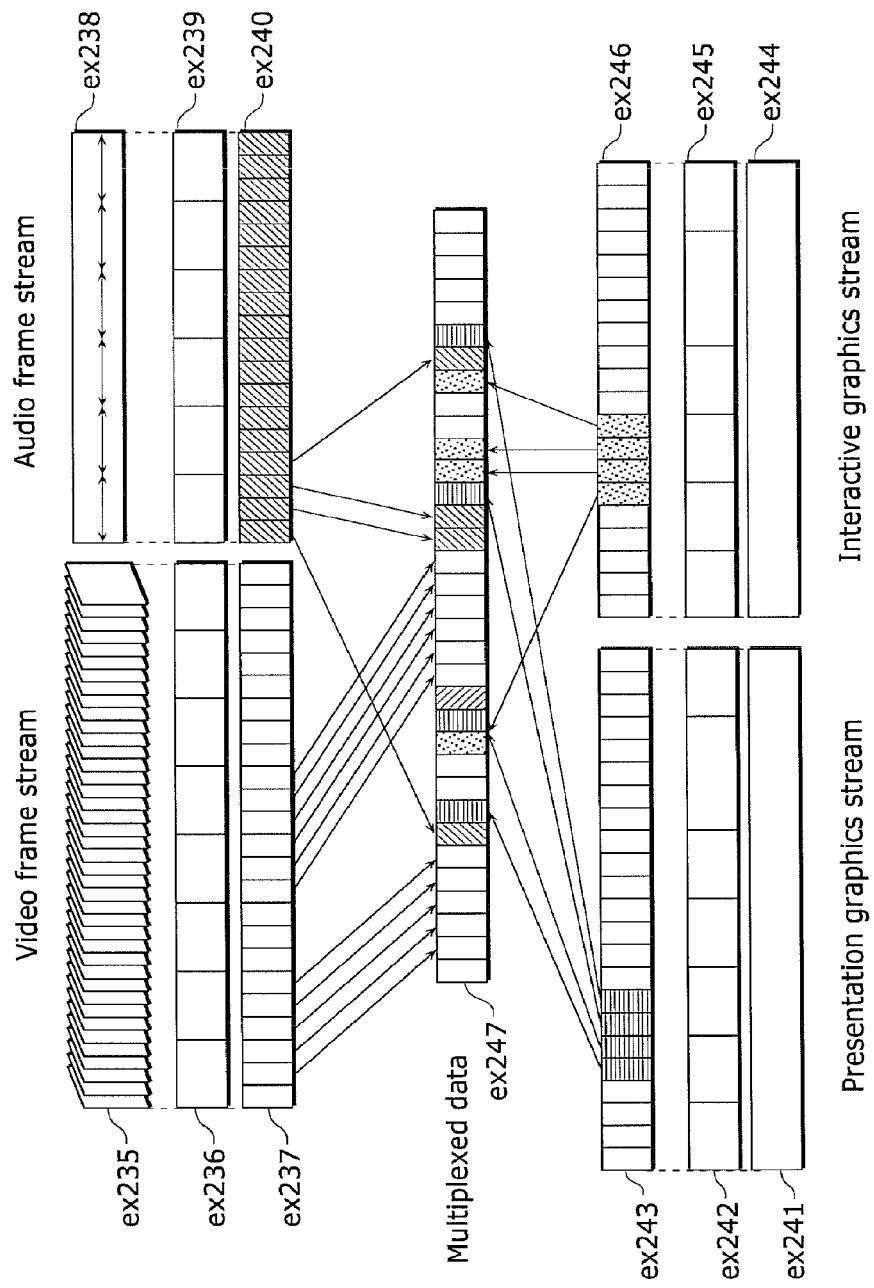
FIG. 31 schematically shows how each stream is multiplexed in multiplexed data.

FIG. 31 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 32:
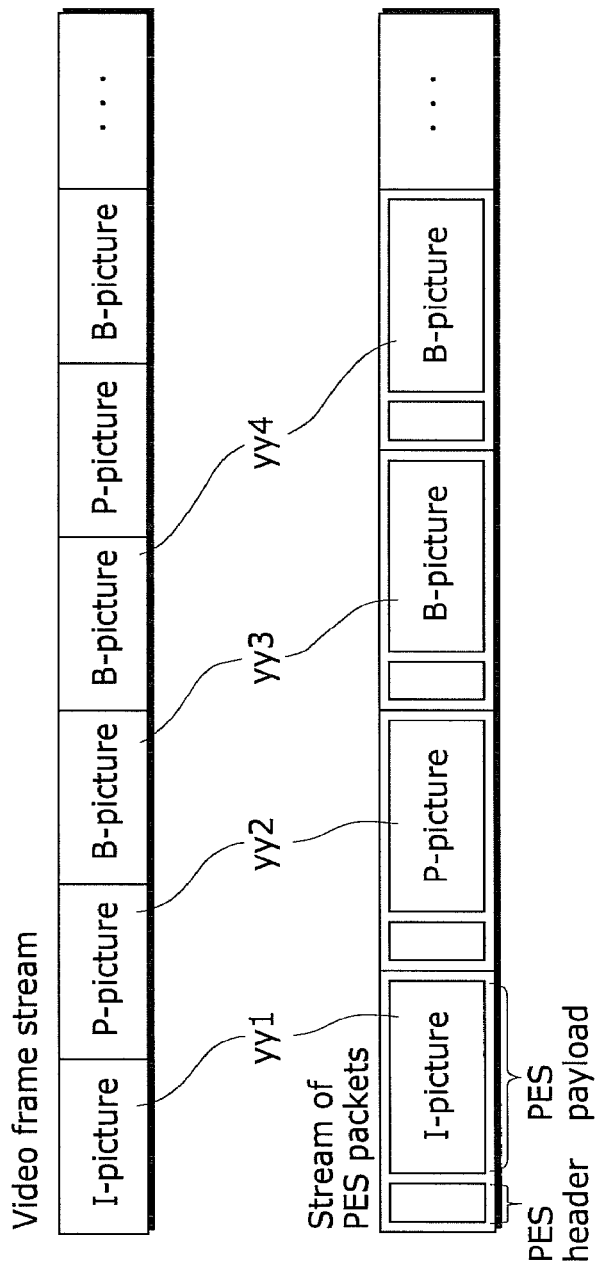
FIG. 32 shows how a video stream is stored in a stream of PES packets in more detail.

FIG. 32 illustrates how a video stream is stored in a stream of PES packets in more detail. The first bar in FIG. 32 shows a video frame stream in a video stream. The second bar shows the stream of PES packets. As indicated by arrows denoted as yy1, yy2, yy3, and yy4 in FIG. 32, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 33:
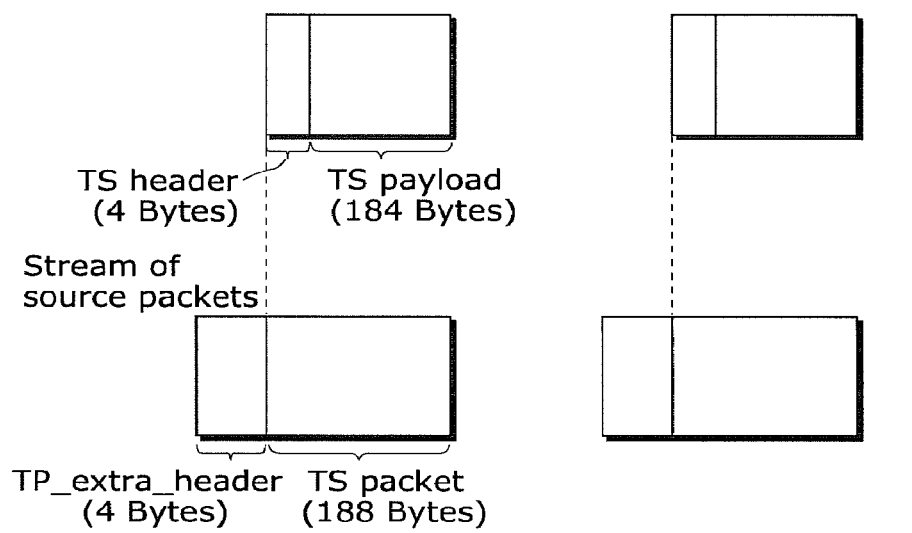
FIG. 33 shows a structure of TS packets and source packets in the multiplexed data.
Figure 33:
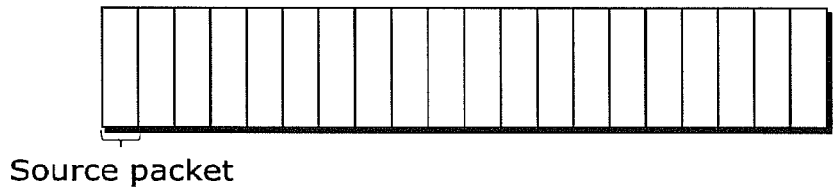

FIG. 33 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 33. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 34:
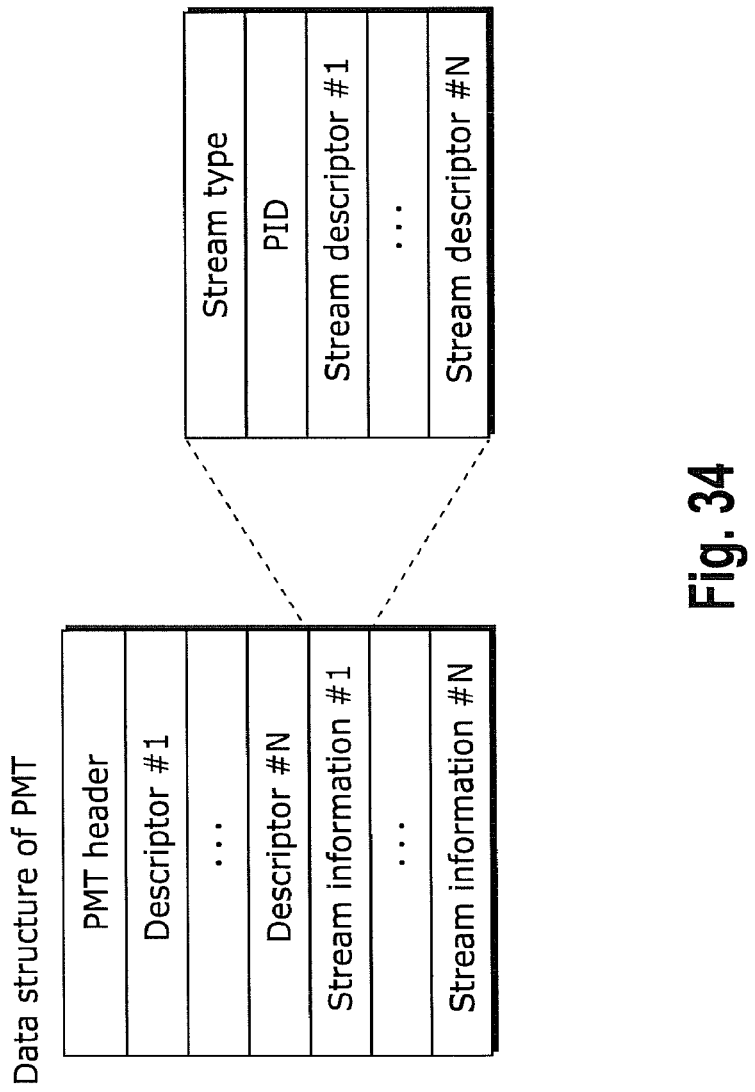
FIG. 34 shows a data structure of a PMT.

FIG. 34 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 35:
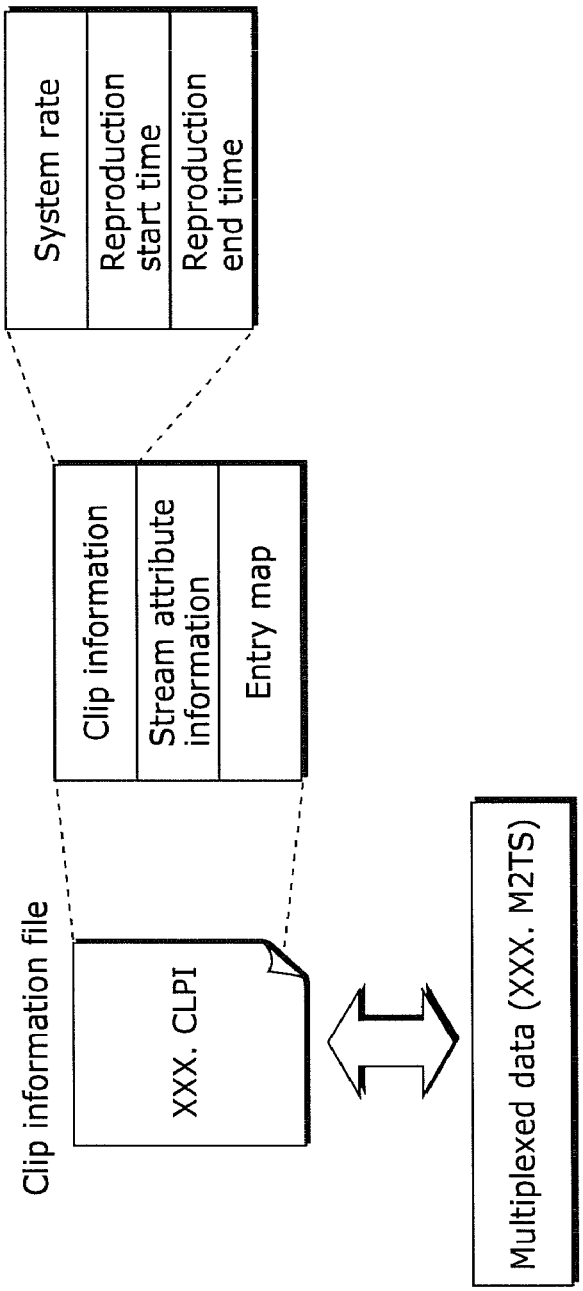
FIG. 35 shows an internal structure of multiplexed data information.

Each of the multiplexed data information files is management information of the multiplexed data as shown in FIG. 35. The multiplexed data information files are in one to one correspondence with the multiplexed data, and each of the files includes multiplexed data information, stream attribute information, and an entry map.

As illustrated in FIG. 35, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 36:
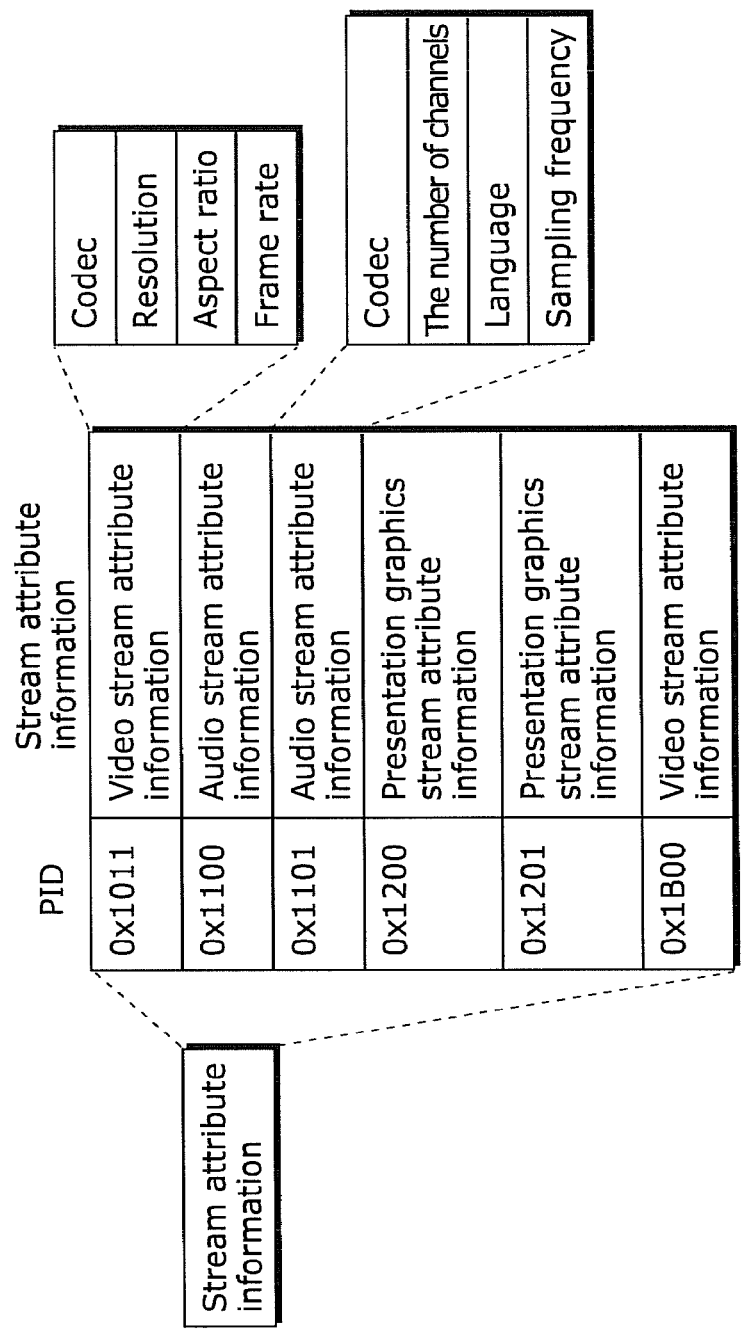
FIG. 36 shows an internal structure of stream attribute information.

As shown in FIG. 36, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 37:
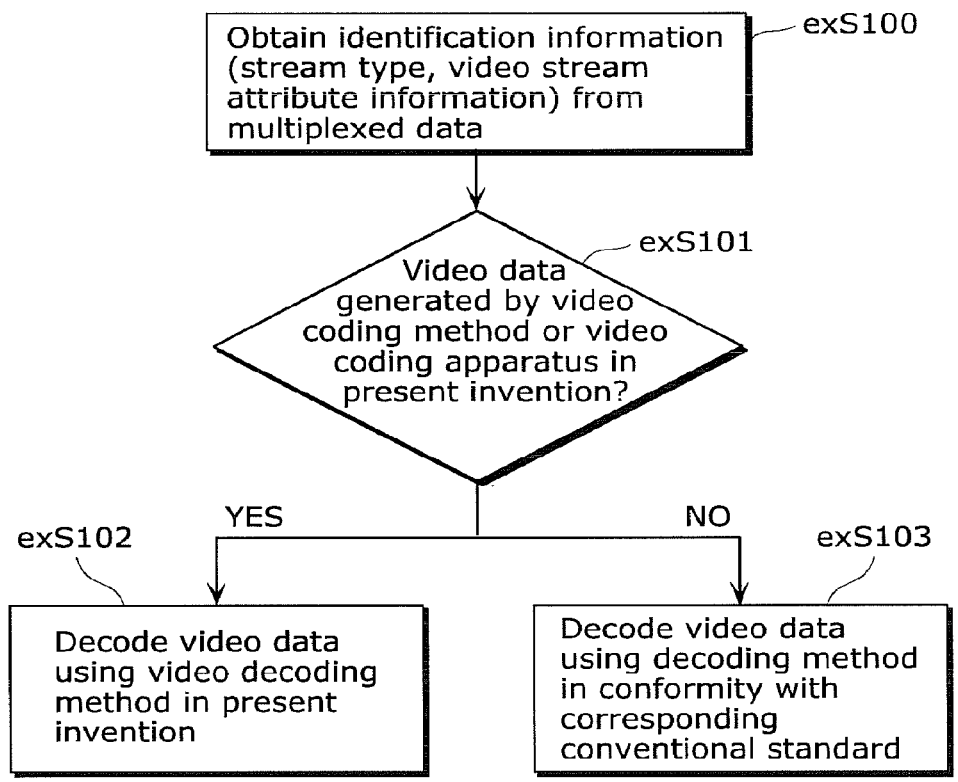
FIG. 37 shows steps for identifying video data.

Furthermore, FIG. 37 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 4

Figure 38:
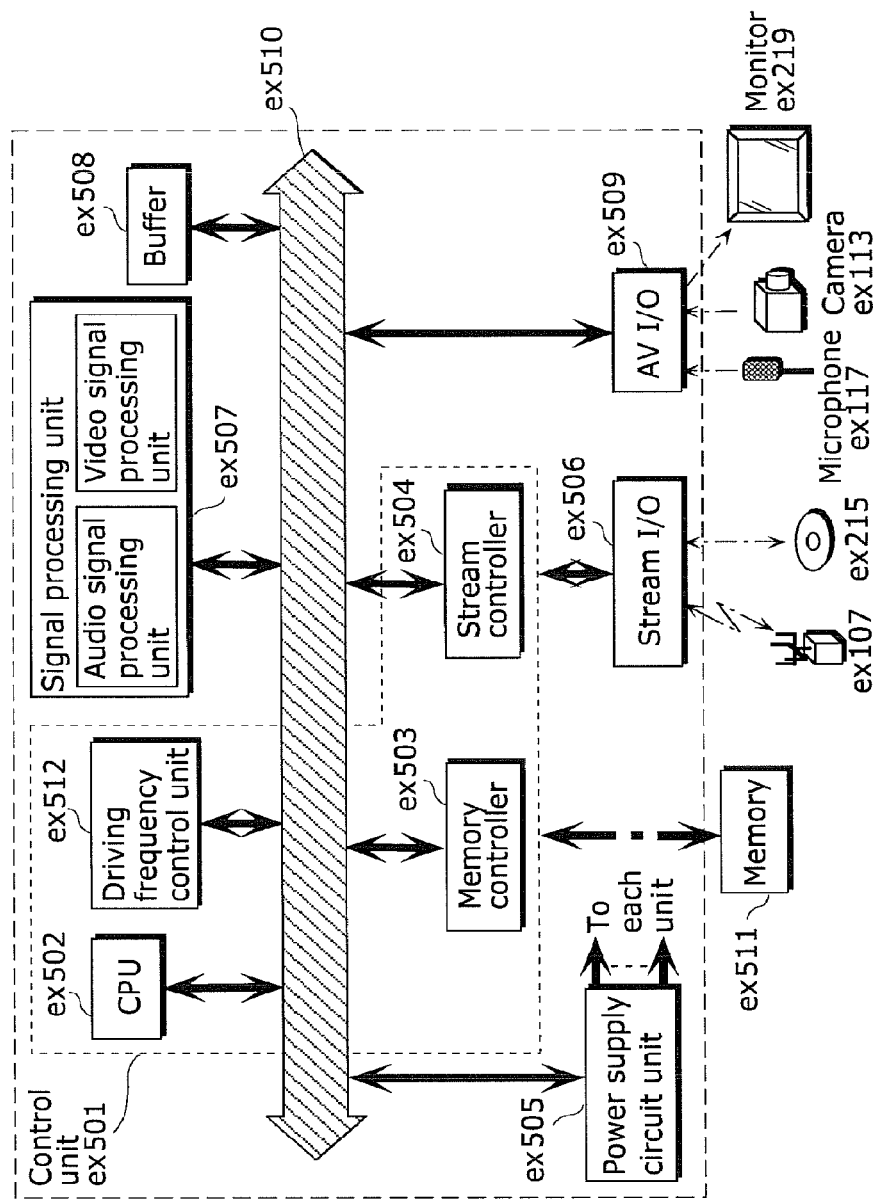
FIG. 38 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 38 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 5

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 39:
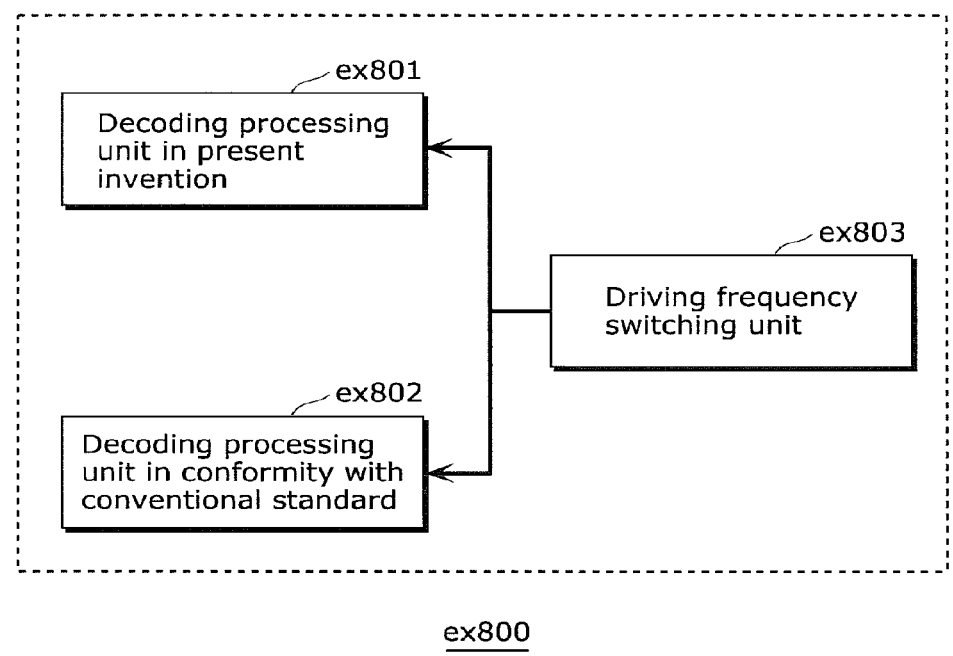
FIG. 39 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 39 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 38. Here, each of the decoding processing unit ex801 that executes the moving picture decoding method described in each of embodiments and the decoding processing unit ex802 that conforms to the conventional standard corresponds to the signal processing unit ex507 in FIG. 38. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment B is probably used for identifying the video data. The identification information is not limited to the one described in Embodiment B but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 41. The driving frequency can be selected by storing the look-up table in the buffer ex508 and in an internal memory of an LSI, and with reference to the look-up table by the CPU ex502.

Figure 40:
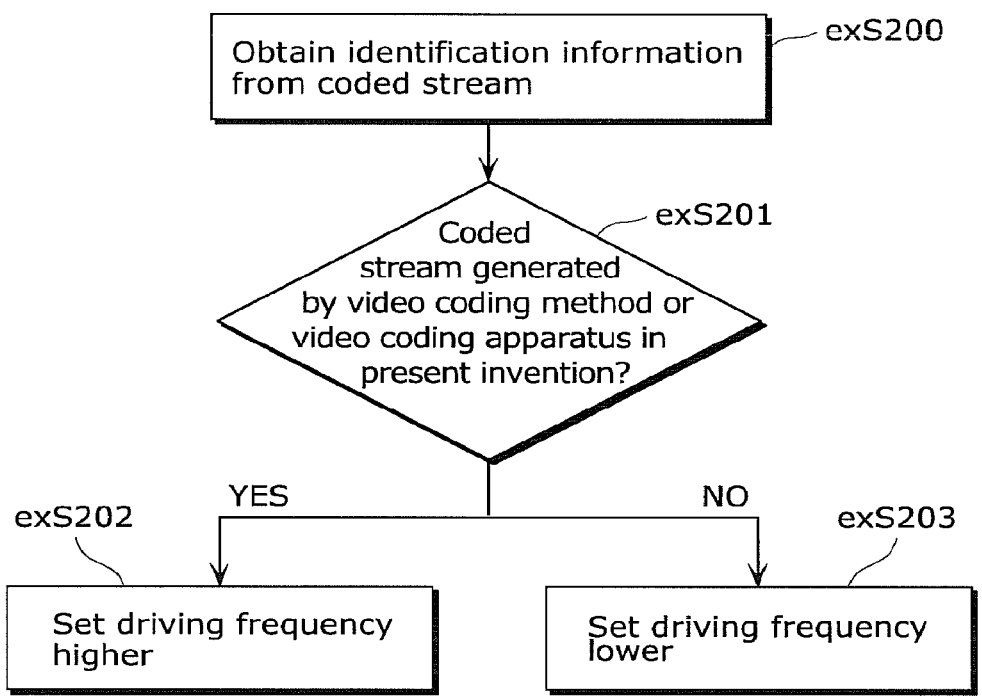
FIG. 40 shows steps for identifying video data and switching between driving frequencies.

FIG. 40 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 6

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 42A:
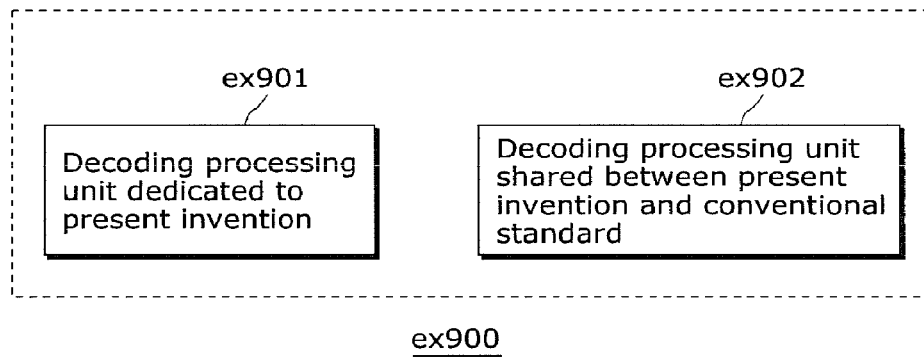
FIG. 42A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 42A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 42B:
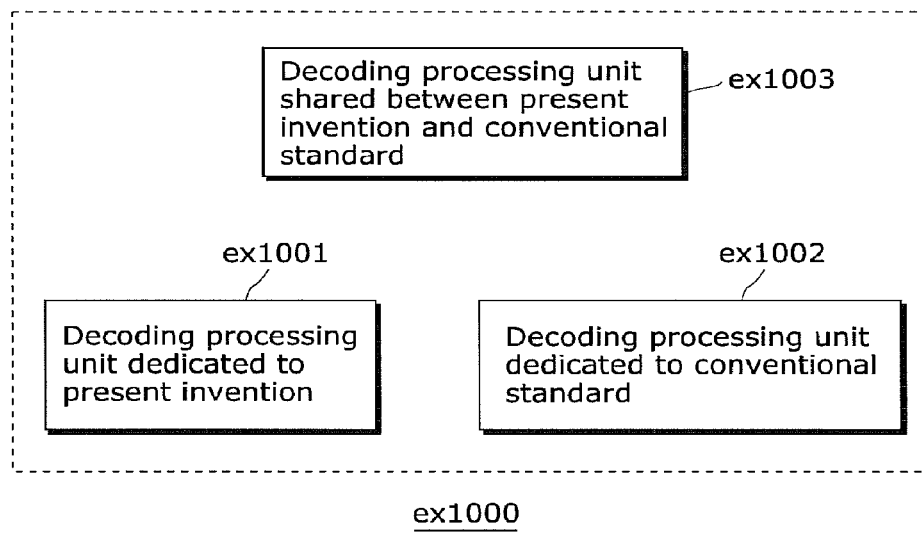
FIG. 42B is a diagram showing another example of a configuration for sharing a module of the signal processing unit.

Furthermore, ex1000 in FIG. 42B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

In summary, the present disclosure relates to deblocking filtering, which may be advantageously applied for blockwise encoding and decoding of images or video signals. In particular, the present disclosure relates to an improved memory management in an automated decision on whether to apply or skip deblocking filtering for a block and to selection of the deblocking filter. The decision is performed on the basis of a segmentation of blocks in such a manner that memory usage is optimized. Preferably, the selection of appropriate deblocking filters is improved so as to reduce computational expense.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the method for deblocking filtering of images according to each of the embodiments is a program described below.

The program causes a computer to execute dividing each of a first and a second block that are separated by a first boundary into at least two segments along a line that is perpendicular to said first boundary, and judging whether or not to apply a deblocking filter to pixels adjacent to the first boundary of the first and the second block, wherein the judgment is individually performed for a pair of adjacent segments on both sides of the first boundary using sample pixels in the pair of adjacent segments, such that no pixels belonging to other segments are used in the judgment, and the division of the blocks into segments is performed such that a segment of a block includes all pixels of the block required for judging whether or not to apply a deblocking filter and/or a selection of the deblocking filter for deblocking pixels adjacent to a second boundary between said block and a third block, wherein the second boundary is perpendicular to the first boundary.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

A method and apparatus for deblocking filtering according to one aspect of the present disclosure is applicable to, for example, television receivers, digital video recorders, car navigation systems, mobile phones, digital cameras, and digital video cameras.

The invention claimed is:

1. A decoding device decoding blocks of a frame, comprising:
  a processor; and
  a memory coupled to the processor;
  wherein the processor performs the following:
  dividing each of a first block and a second block that are separated by a first boundary into at least two segments along a line that is perpendicular to said first boundary, the first block and the second block being included in the frame; and
  judging whether or not to apply an in-loop deblocking filter to pixels adjacent to the first boundary of the first block and the second block, wherein
  the judgment is individually performed for a pair of adjacent segments on both sides of the first boundary using sample pixels in the pair of adjacent segments without using pixels belonging to other segments,
  the division of the first block and the second block into segments is performed such that a segment of one of the first block and the second block includes all pixels of said one of the first block and the second block required for:
  (i) judging whether or not to apply an in-loop deblocking filter; and
  (ii) selecting an in-loop deblocking filter for deblocking pixels adjacent to a second boundary, the second boundary being between a third block and said one of the first block and the second block,
  the third block is adjacent to said one of the first block and the second block,
  the third block is different from the first block and the second block, and
  the second boundary is perpendicular to the first boundary.

2. A decoding method for deblocking filtering of image blocks of pixels, comprising the steps of:
  dividing each of a first block and a second block that are separated by a first boundary into at least two segments along a line that is perpendicular to said first boundary, the first block and the second block being included in the frame; and
  judging whether or not to apply an in-loop deblocking filter to pixels adjacent to the first boundary of the first block and the second block, wherein
  the judgment is individually performed for a pair of adjacent segments on both sides of the first boundary using sample pixels in the pair of adjacent segments without using pixels belonging to other segments,
  the division of the first block and the second block into segments is performed such that a segment of one of the first block and the second block includes all pixels of said one of the first block and the second block required for:
(i) judging whether or not to apply an in-loop deblocking filter; and
(ii) selecting an in-loop deblocking filter for deblocking pixels adjacent to a second boundary, the second boundary being between a third block and said one of the first block and the second block,
the third block is adjacent to said one of the first block and the second block,
the third block is different from the first block and the second block, and
the second boundary is perpendicular to the first boundary.

3. A coding device decoding blocks of a frame, comprising:
a processor; and
a memory coupled to the processor;
wherein the processor performs the following:
dividing each of a first block and a second block that are separated by a first boundary into at least two segments along a line that is perpendicular to said first boundary, the first block and the second block being included in the frame; and
judging whether or not to apply an in-loop deblocking filter to pixels adjacent to the first boundary of the first block and the second block, wherein
the judgment is individually performed for a pair of adjacent segments on both sides of the first boundary using sample pixels in the pair of adjacent segments without using pixels belonging to other segments,
the division of the first block and the second block into segments is performed such that a segment of one of the first block and the second block includes all pixels of said one of the first block and the second block required for:
(i) judging whether or not to apply an in-loop deblocking filter; and
(ii) selecting an in-loop deblocking filter for deblocking pixels adjacent to a second boundary, the second boundary being between a third block and said one of the first block and the second block,
the third block is adjacent to said one of the first block and the second block,
the third block is different from the first block and the second block, and
the second boundary is perpendicular to the first boundary.

4. A coding method for deblocking filtering of image blocks of pixels, comprising the steps of:
dividing each of a first block and a second block that are separated by a first boundary into at least two segments along a line that is perpendicular to said first boundary, the first block and the second block being included in the frame; and
judging whether or not to apply an in-loop deblocking filter to pixels adjacent to the first boundary of the first block and the second block, wherein
the judgment is individually performed for a pair of adjacent segments on both sides of the first boundary using sample pixels in the pair of adjacent segments without using pixels belonging to other segments,
the division of the first block and the second block into segments is performed such that a segment of one of the first block and the second block includes all pixels of said one of the first block and the second block required for:
(i) judging whether or not to apply an in-loop deblocking filter; and
(ii) selecting an in-loop deblocking filter for deblocking pixels adjacent to a second boundary, the second boundary being between a third block and said one of the first block and the second block,
the third block is adjacent to said one of the first block and the second block,
the third block is different from the first block and the second block, and
the second boundary is perpendicular to the first boundary.

* * * * *